(12) United States Patent
Sarkis et al.

(10) Patent No.: US 11,923,971 B2
(45) Date of Patent: Mar. 5, 2024

(54) MODULATION AND CODING SCHEME TABLE SELECTION FOR SIDELINK COMMUNICATIONS

(71) Applicant: QUALCOMM Incorporated, San Diego, CA (US)

(72) Inventors: Gabi Sarkis, San Diego, CA (US); Tien Viet Nguyen, Bridgewater, NJ (US); Kapil Gulati, Belle Mead, NJ (US); Shuanshuan Wu, San Diego, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 17/037,325

(22) Filed: Sep. 29, 2020

(65) Prior Publication Data

US 2021/0105081 A1 Apr. 8, 2021

Related U.S. Application Data

(60) Provisional application No. 62/909,594, filed on Oct. 2, 2019.

(51) Int. Cl.
*H04W 4/00* (2018.01)
*H04L 1/00* (2006.01)
(Continued)

(52) U.S. Cl.
CPC .......... *H04L 1/0004* (2013.01); *H04L 1/0003* (2013.01); *H04L 1/0026* (2013.01);
(Continued)

(58) Field of Classification Search
None
See application file for complete search history.

(56) References Cited

U.S. PATENT DOCUMENTS

2015/0237639 A1  8/2015  Garrett et al.
2018/0279337 A1  9/2018  Kwon et al.
(Continued)

FOREIGN PATENT DOCUMENTS

CN  108702239 A   10/2018
EP    3952436 A1   2/2022

OTHER PUBLICATIONS

Huawei et al., "Miscellaneous Corrections in TS 36.331 on eV2X", R2-1818716, 3GPP TSG-RAN WG2 Meeting #104, Spokane, USA, Oct. 12-16, 2018, 11 pages.

(Continued)

*Primary Examiner* — Bob A Phunkulh
(74) *Attorney, Agent, or Firm* — Holland & Hart LLP

(57) ABSTRACT

Methods, systems, and devices for wireless communications are described. A communication device, which may be otherwise known as user equipment (UE), may identify a default modulation and coding scheme table and a preconfigured modulation and coding scheme table associated with a resource pool. The UE may receive, from a transmitting communication device, an indication of the preconfigured modulation and coding scheme table to use for upcoming sidelink communications. The UE may then communicate based on the preconfigured modulation and coding scheme table.

30 Claims, 15 Drawing Sheets

(51) Int. Cl.
*H04L 1/1812* (2023.01)
*H04L 5/00* (2006.01)
*H04L 27/34* (2006.01)
*H04L 69/324* (2022.01)
*H04W 72/20* (2023.01)
*H04W 72/23* (2023.01)
*H04W 76/10* (2018.01)

(52) U.S. Cl.
CPC .......... *H04L 1/1812* (2013.01); *H04L 5/0055* (2013.01); *H04L 27/34* (2013.01); *H04L 69/324* (2013.01); *H04W 72/20* (2023.01); *H04W 72/23* (2023.01); *H04W 76/10* (2018.02)

(56) References Cited

U.S. PATENT DOCUMENTS

| | | | |
|---|---|---|---|
| 2018/0324010 | A1 | 11/2018 | Gulati et al. |
| 2019/0182859 | A1 | 6/2019 | Khoryaev et al. |
| 2019/0238257 | A1 | 8/2019 | Hosseini et al. |
| 2019/0306923 | A1* | 10/2019 | Xiong ................... H04L 5/0051 |
| 2020/0052843 | A1 | 2/2020 | Cheng et al. |
| 2020/0053835 | A1* | 2/2020 | Ye ............................ H04L 1/08 |
| 2020/0287654 | A1* | 9/2020 | Xi ......................... H03M 13/13 |
| 2020/0413431 | A1 | 12/2020 | Park et al. |
| 2021/0105083 | A1 | 4/2021 | Sarkis et al. |
| 2021/0314974 | A1* | 10/2021 | Miao ................. H04W 72/1263 |
| 2021/0345360 | A1* | 11/2021 | Yeo .......................... H04W 4/46 |
| 2021/0377912 | A1* | 12/2021 | El Hamss ............. H04L 1/1819 |
| 2022/0007403 | A1* | 1/2022 | Li ..................... H04W 72/1289 |
| 2022/0015067 | A1* | 1/2022 | Li ..................... H04W 72/0453 |
| 2022/0053513 | A1* | 2/2022 | Ryu ....................... H04L 1/0026 |
| 2022/0173828 | A1* | 6/2022 | Yoshioka .............. H04W 72/02 |

OTHER PUBLICATIONS

Huawei, et al., "Coexistence of R14 UEs and R15 UEs regarding 64QAM", 3GPP TSG RAN WG2 Meeting #101 bis, 3GPP Draft; R2-1804633, Coexistence of R14 UEs and R15 UEs regarding 64QAM, 3rd Generation Partnership Project (3GPP), Mobile Competence Centre, 650, Route Des Lucioles; F-06921 Sophia-Antipolis Cedex, France, vol. RAN WG2, No. Sanya, China; Apr. 16, 2018-Apr. 20, 2018, Apr. 14, 2018 (Apr. 14, 2018), pp. 1-3, XP051428350, Retrieved from the Internet: URL: http://www.3gpp.org/ftp/Meetings%5F3GPP%5FSYNC/RAN2/Docs/ [retrieved on Apr. 14, 2018].

Huawei (Rapporteur): "Summary of [101bis#84][LTE/V2X]—Discussion on the Issues for Running RRC CR," 3GPP Draft, 3GPP TSG-RAN WG2 Meeting #102, R2-1807424 Summary of [101BIS#84] [LTEV2X]—Discussions on the Issues for Running RRC CR, 3rd Generation Partnership Project (3GPP), Mobile Competence Centre, 650, Route Des Lucioles, F-06921, Sophia-Antipolis Cedex, France, vol. RAN WG2, No. Busan, Korea; May 21, 2018-May 25, 2018, May 18, 2018 (May 18, 2018), XP051465109, 24 pages, Retrieved from the Internet: URL: http://www.3gpp.org/ftp/tsg%5Fran/WG2%5FRL2/TSGR2%5F102/Docs [retrieved on 2818-85-18] Section 2.3; p. 9-p. 17.

ITL: "Default Operation of Tx Profile", 3GPP Draft, 3GPP TSG-RAN2 Meeting#103, R2-1812588—Default Operation of Tx Profile, 3rd Generation Partnership Project (3GPP), Mobile Competence Centre, 650, Route Des Lucioles, F-06921, Sophia-Antipolis Cedex, France, vol. RAN WG2, No. Gothenburg, Sweden; Aug. 20, 2018-Aug. 24, 2018, Aug. 10, 2018 (Aug. 10, 2018), XP051522183, 2 pages, Retrieved from the Internet: URL: http://www.3gpp.org/ftp/tsg%5Fran/WG2%5FRL2/TSGR2%5F103/Docs/R2%2D1812588%2Ezip [retrieved on Aug. 10, 2018] Sections 2-3.

Moderator (Samsung): "Text Proposal for Indication of MCS Tables", 3GPP Draft, 3GPP TSG RAN WG1 #100bis-e Meeting, R1-2003135, 3rd Generation Partnership Project (3GPP), Mobile Competence Centre, 650, Route Des Lucioles, F-06921, Sophia-Antipolis Cedex, France, vol. RAN WG1, No. e Meeting; Apr. 20, 2020-Apr. 30, 2020, May 4, 2020 (May 4, 2020), XP051880666, 3 pages, Retrieved from the Internet: URL: https://ftp.3gpp.org/tsg_ran/WG1_RL1/TSGR1_100b_e/Docs/R1-2003135.zip R1-2003135 Text-Proposal for indication of MCS tables v5.docx [retrieved on May 4, 2020] p. 1.

Zte Corporation, et al., "Discussion on UE Capability Transfer", 3GPP Draft, 3GPP TSG RAN WG2 Meeting #107, R2-1909062, Discussion on UE Capability Transfer, 3rd Generation Partnership Project (3GPP), Mobile Competence Centre, 650, Route Des Lucioles, F-06921, Sophia-Antipolis Cedex, France, vol. RAN WG2, No. Prague, Czech Republic; Aug. 26, 2019-Aug. 30, 2019, Aug. 16, 2019 (Aug. 16, 2019), XP051766872, 6 pages, Retrieved from the Internet: URL: http://www.3gpp.org/ftp/tsg_ran/WG2_RL2/TSGR2_107/Docs/R2-1909062.zip [retrieved on Aug. 16, 2019] Section 2.3; p. 4-p. 5.

Zte, et al., "Support for 64-QAM", 3GPP Draft, 3GPP TSG RAN WG1 Meeting #92bis, R1-1803894—6.2.5.2 Support for 64QAM, 3rd Generation Partnership Project (3GPP), Mobile Competence Centre, 650, Route Des Lucioles, F-06921, Sophia-Antipolis Cedex, France, vol. RAN WG1, No. Sanya, China, Apr. 16, 2018-Apr. 20, 2018, Apr. 15, 2018 (Apr. 15, 2018), XP051426187, 7 pages, Retrieved from the Internet: URL: http://www.3gpp.org/ftp/Meetings%5F3GPP%5FSYNC/RAN1/Docs/ [retrieved on Apr. 15, 2018] Section 2; p. 2-p. 3.

* cited by examiner

MODULATION AND CODING SCHEME TABLE SELECTION FOR SIDELINK COMMUNICATIONS

CROSS REFERENCE

The present application for patent claims the benefit of U.S. Provisional Patent Application No. 62/909,594 by SARKIS et al., entitled "MODULATION AND CODING SCHEME TABLE SELECTION FOR SIDELINK COMMUNICATIONS," filed Oct. 2, 2019, assigned to the assignee hereof, and expressly incorporated by reference herein.

BACKGROUND

The following relates generally to wireless communications, and more specifically to modulation and coding scheme table selection for sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support both access links and sidelinks. An access link is a communication link between a UE and a base station. In some examples, an access link may be referred to as a Uu interface. Specifically, the Uu interface may refer to an over-the-air interface for downlink transmissions, uplink transmissions, or both. A sidelink is a communication link between similar devices. For example, a sidelink may support communications between multiple UEs (e.g., in a vehicle-to-everything (V2X) system, a vehicle-to-vehicle (V2V) system, a device-to-device (D2D) system, among other examples). In some examples, a sidelink may support unicast messaging, groupcast messaging, multicast messaging, broadcast messaging, or combinations thereof. In such systems, techniques for reliable communication may be desirable.

SUMMARY

The described techniques relate to improved methods, systems, devices, and apparatuses that support modulation and coding scheme table selection for sidelink communications. Generally, the described techniques provide for efficient power saving techniques and reliable communications. The described techniques may enable a communication device, which may be a base station (e.g., eNodeB (eNBs), next-generation NodeB or giga-NodeB (any of which may be referred to as a gNB)) or a user equipment (UE) in a wireless communications system (e.g., a vehicle-to-everything (V2X) system, a vehicle-to-vehicle (V2V) network, a cellular V2X (C-V2X) network, a device-to-device (D2D) system, and the like) to transmit (or receive) an indication of modulation and coding scheme tables. For example, a communication device may identify a default modulation and coding scheme table and a preconfigured modulation and coding scheme table associated with a resource pool. The communication device participating in sidelink communications may then transmit, to another communication device, an indication of a modulation and coding scheme table to use for upcoming sidelink communications. The communication device may, as a result, include features for improvements to power consumption, spectral efficiency, higher data rates and, in some examples, may promote enhanced efficiency for sidelink communications.

DETAILED DESCRIPTION

Figure 1:
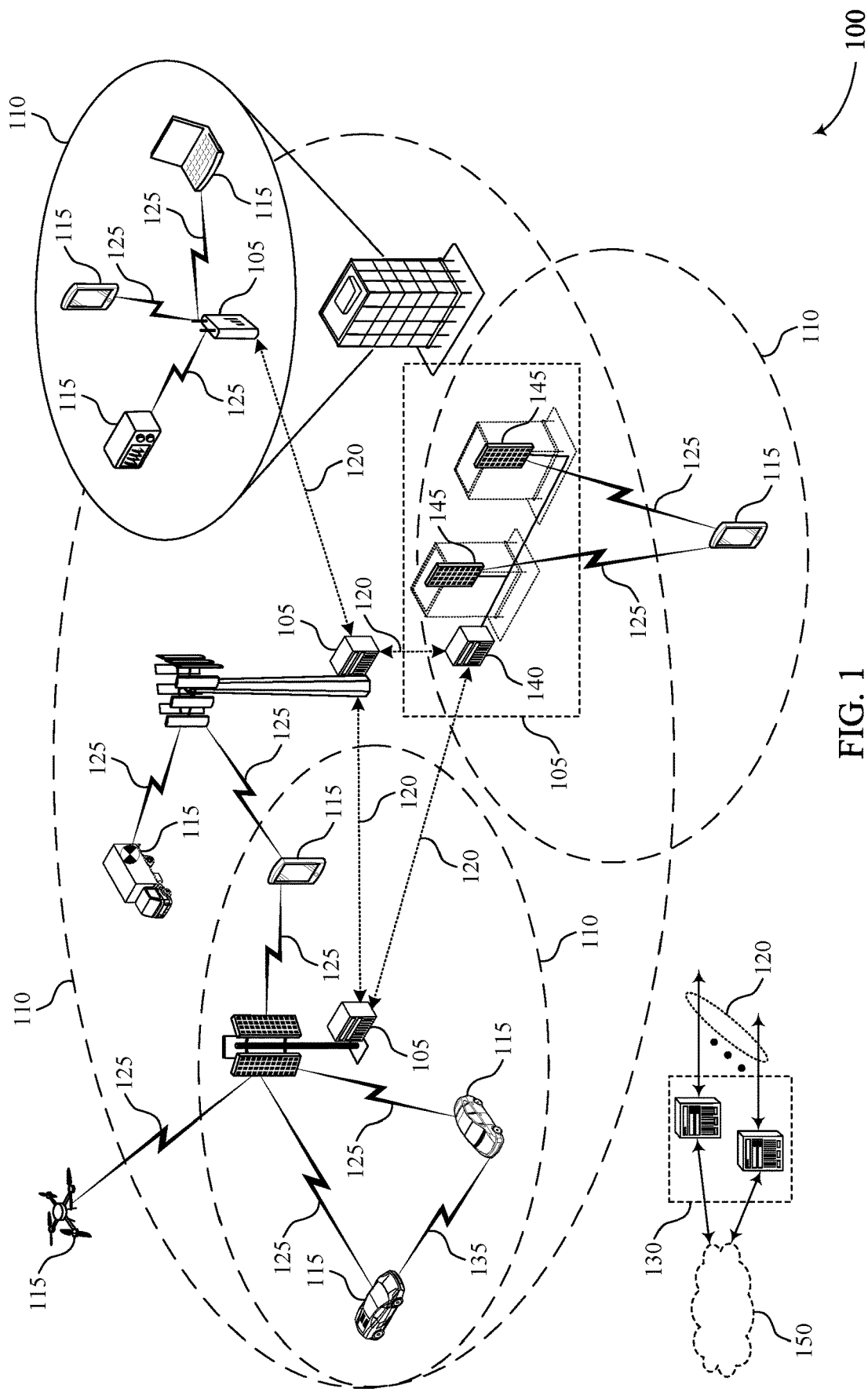
FIG. 1 illustrates an example of a wireless communications system that supports modulation and coding scheme table selection for sidelink communications in accordance with aspects of the present disclosure.

A wireless communications system may support both access links and sidelinks for communications between one or more communication devices. An access link may refer to a communication link between a user equipment (UE) and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications may support communications within a group of UEs. For example, sidelink communications may include communications between a UE and other UEs within a coverage area including the group of UEs (e.g., a coverage area provided by a base station, a coverage area outside of the coverage area provided by the base station, or a combination thereof). One or more of the UEs in the group of UEs may initiate sidelink communications with other UEs in the group of UEs. For example, a UE may have information to transmit to the group of UEs (e.g., a detection of an object or obstacle on a road in a V2X system, scheduling information, among other examples) and the UE may initiate a sidelink communications including the information to the other UEs. The other UEs may monitor sidelink resource pools for the sidelink communications. In some examples, base stations may not be involved in sidelink communications and multiple UEs on the sidelink may receive a data transmission from a single UE, or a single UE may receive data transmissions from multiple UEs. It may be desirable to support modulation and coding scheme table indication for sidelink communications, so that UEs can communicate with high reliability.

According to one or more aspects of the present disclosure, wireless communications systems supporting sidelink communications may support modulation and coding scheme table indication. For example, in sidelink groupcast or multicast communications, one or more of the UEs in the group of UEs may communicate a modulation and coding scheme table to improve communication performance with the group of UEs. In sidelink unicast communications, a transmitter UE may identify a default modulation and coding scheme table and a preconfigured modulation and coding scheme table associated with a resource pool. For example, each of the default modulation and coding scheme table and the preconfigured modulation and coding scheme table may be associated with a 256 quadrature amplitude modulation or a 64 quadrature amplitude modulation or a low spectral-efficiency 64 quadrature amplitude modulation. A receiving UE in the group of UEs may receive the indication and may use the indicated modulation and coding scheme table to communicate with other UEs in the group of UEs.

UEs capable of sidelink communications may utilize the techniques described herein to experience power saving for sidelink communications, such as reduced power consumption and extended battery life while ensuring reliable and efficient communications in the group of UEs. Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. In some examples, the UEs may support high reliability and low latency sidelink communications, among other examples, in accordance with modulation and coding scheme table selection and transmission in sidelink communications. The described techniques may thus include features for improvements to power consumption, spectral efficiency, higher data rates and, in some examples, may promote enhanced efficiency for high reliability and low latency operations, among other benefits.

Aspects of the disclosure are initially described in the context of a wireless communications system. Aspects of the disclosure are further illustrated by and described with reference to apparatus diagrams, system diagrams, and flowcharts that relate to modulation and coding scheme table selection for sidelink communications.

FIG. 1 illustrates an example of a wireless communications system 100 that supports modulation and coding scheme table selection for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support transmission of indication of modulation and coding scheme table to increase reliability in sidelink communications (e.g., over a communication link 125). Some wireless communications systems do not provide for modulation and scheme table indication in sidelink communications. In some examples, a transmitting UE 115 (e.g., a UE 115 transmitting a sidelink) may identify a default modulation and coding scheme table and a preconfigured modulation and coding scheme table associated with a resource pool. In some examples, each of the default modulation and coding scheme table and the preconfigured modulation and coding scheme table may be associated with a 256 quadrature amplitude modulation or a 64 quadrature amplitude modulation or a low spectral-efficiency 64 quadrature amplitude modulation. The transmitter UE 115 may transmit an indication of the default modulation and coding scheme table or the preconfigured modulation and coding scheme table. A receiving UE 115 may receive the indication and may determine which modulation and coding scheme table to use for upcoming sidelink communications. Methods to indicate modulation and coding scheme tables for sidelink communications may improve throughput and reliability in sidelink communications.

Figure 2:
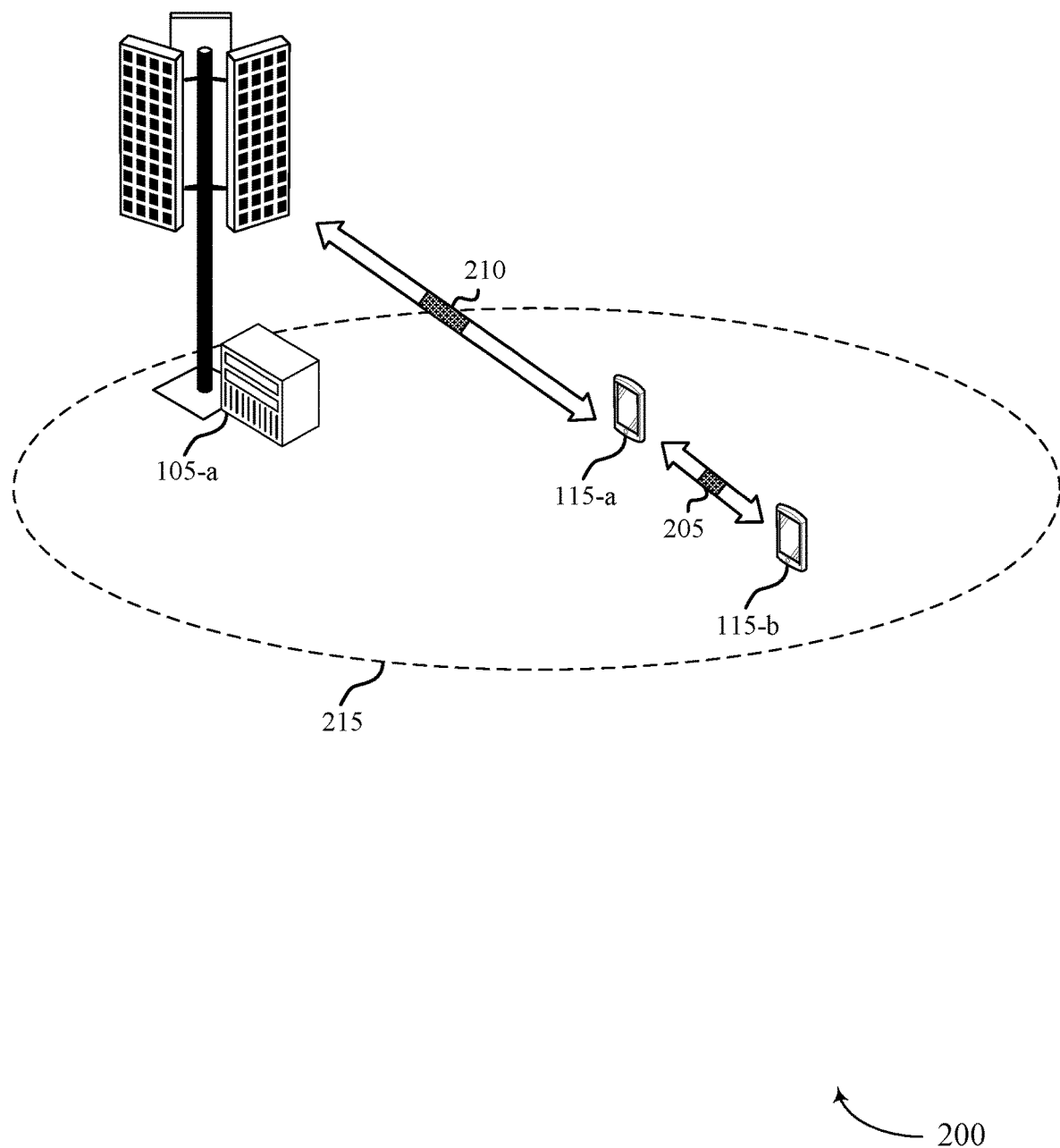
FIG. 2 illustrates an example of a wireless communications system that supports modulation and coding scheme table selection for sidelink communications in accordance with aspects of the present disclosure.

FIG. 2 illustrates an example of a wireless communications system 200 that supports modulation and coding scheme table selection for sidelink communications in accordance with aspects of the present disclosure. In some examples, the wireless communications system 200 may implement aspects of wireless communications system 100. In some examples, the wireless communications system 200 may include a base station 105-a and a group of UEs 115 (e.g., UE 115-a and UE 115-b). In some examples, the base station 105-a may be an example of a base station 105 and the UE 115-a and the UE 115-b may be examples of UEs 115, described with reference to FIG. 1. In some cases, the group of UEs 115 may communicate with each other (e.g., within a V2X system, a D2D system, and the like) and may employ sidelink transmissions to save power and ensure reliable communications.

The wireless communications system 200 may support both access links and sidelinks for communications between one or more communication devices. An access link may refer to a communication link between a UE 115 (such as UE 115-a and UE 115-b) and a base station 105-a. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE to one or more other UEs.

As depicted in the example of FIG. 2, the UE 115-a and the UE 115-b may communicate with each other (or with another group of UEs 115) over sidelink communications 205 (e.g., using a peer-to-peer (P2P) or D2D protocol). For instance, the UE 115-a may be a transmitting UE and the UE 115-b may be a receiving UE. In some cases, the UE 115-a may transmit sidelink transmissions 205 to the UE 115-b. In some examples, the UE 115-a or the UE 115-b may monitor resource pools for the sidelink communications 205 or indications of the sidelink communications 205 (e.g., resource reservations, control channel transmissions, among other examples) from other UEs 115 in the group. Additionally or alternatively, the UEs 115 may have data to transmit to (or receive from) one or more of the UEs 115 in the group and may use the sidelink communications 205 to transmit the data. In some examples, the group of UEs 115 may utilize sidelinks (e.g., the sidelink communications 205) in addition to access links with the base station 105.

In some examples, sidelink communications may support communications within a group of UEs 115. For instance, sidelink communications may include communications between a UE (such as UE 115-a and UE 115-b) and other UEs 115 within a coverage area including the group of UEs (e.g., a coverage area provided by a base station, a coverage area outside of the coverage area provided by the base station, or a combination thereof). One or more of the UEs 115 in the group of UEs 115 may initiate sidelink communications with other UEs in the group of UEs. For example, one or more of the UEs 115 may be in a coverage area 215 (e.g., a coverage area 110 with reference to FIG. 1) of the base station 105. In such examples, a UE 115 may communicate with the base station 105 via a Uu interface (e.g., the base station 105 may transmit downlink communications to one or more of the UEs 115 via an access link 210). In some other examples, the group of UEs 115 may not be located within the coverage area or may not communicate with the base station 105 using an access link.

In some cases, a UE 115 (such as UE 115-a and UE 115-b) may have information (e.g., a detection of an object or obstacle on a road in a V2X system, scheduling information, among other examples) to transmit to the group of UEs 115, and the UE 115 may initiate a sidelink communications including the information to the other UEs 115. In such cases, the UE 115 initiating the sidelink communications may be referred to as a transmitting UE and the UE 115 receiving the sidelink communications may be referred to as a receiving UE. In the example of FIG. 2, the UE 115-a is a transmitting UE and the UE 115-b is a receiving UE. For instance, the UE 115-b may monitor sidelink resource pools for the sidelink communications receiving from the UE 115-a. Current wireless communications systems do not provide for a modulation and coding scheme table selection for sidelink communications.

Existing wireless communications systems may support a communications link associated with multiple modulation orders, such as quadrature phase shift keying, 16 quadrature amplitude modulation, 64 quadrature amplitude modulation, low spectral-efficiency 64 quadrature amplitude modulation, and 256 quadrature amplitude modulation. In some cases, control information may provide an indication of a set of modulation and coding schemes to select from a plurality of sets of modulation and coding schemes. The control information may further provide an index value for an entry in the selected set of modulation and coding scheme. As described herein, a set of modulation and coding schemes may refer to a table of modulation and coding schemes.

In some cases, as part of a connection establishment to establish a communication link (e.g., an access link), a UE may provide a channel quality indication report and the base station may configure a channel quality indication table that is to be used at the UE. The channel quality indication table may map modulation orders and coding rates to a number (e.g., 16) of index values that are based on channel quality indication values measured at the UE. In some wireless communications systems, the channel quality indication may include information sent from UE to the base station to indicate a suitable downlink transmission data rate (such as a modulation and coding scheme value). In some cases, as part of the channel quality indication estimation process, a UE may account for UE capability associated with a number of antennas at the UE and a type of receiver used for detection by the UE.

In some wireless communications systems, a base station may utilize the channel quality indication value to determine an entry in a modulation and coding scheme table for a UE. The base station may then indicate the modulation and coding scheme in a signaled control information (such as downlink control information). Thus, the signaled modulation and coding scheme and the channel quality indication table may be used by the UE to determine a modulation order, coding rate, and a transport block size for an upcoming transmission. In some cases, the entry of the modulation and coding scheme table may be indicated as part of the control information. In some wireless communications systems, a modulation and coding scheme table for a physical downlink shared channel may be associated with a 64 quadrature amplitude modulation, a low spectral efficiency 64 quadrature amplitude modulation, and a 256 quadrature amplitude modulation. The wireless communications systems may use spectral efficiency and reliability as performance metrices for assigning modulation orders and coding schemes to a UE. In some examples, a base station may transmit a first value of the downlink control information (e.g., DCI 1-0) indicate the 64 quadrature amplitude modulation. Alternatively, the base station may transmit a second value of the downlink control information indicate the 256 quadrature amplitude modulation.

In some wireless communications systems, a first radio resource control may be configured to indicate 256 quadrature amplitude modulation, a second radio resource control may be configured to indicate 64 quadrature amplitude modulation, and a third radio resource control may be configured to indicate low spectral efficiency 64 quadrature amplitude modulation. In some cases, the radio resource control may include a secondary indication pointing to the modulation and coding scheme table associated with low spectral efficiency 64 quadrature amplitude modulation. In some cases, the secondary indication can be a radio network temporary identifier (e.g., MCS-C-RNTI). For instance, an MCS-C-RNTI may indicate that a physical downlink shared channel is associated with a low-spectral efficiency modulation and coding scheme table. That is, a UE may determine that if a cyclic redundancy check is scrambled with MCS-C-RNTI, then the physical downlink shared channel is associated with the low-spectral efficiency modulation and coding scheme table. Alternatively, if a cyclic redundancy check is scrambled with C-RNTI, then the UE may determine that the physical downlink shared channel is associated with the 64 quadrature amplitude modulation or the 256 quadrature amplitude modulation (depending of radio resource control indication).

In some cases, if MCS-C-RNTI is not configured, then a search space of the physical downlink control channel may indicate the modulation and coding scheme table to be used by a UE. Thus, in some wireless communications systems, a base station may be able to control the modulation and coding scheme table selection process. However, such wireless communications systems may not provide for a modulation and coding scheme table selection method for devices participating in sidelink communications. In some examples, sidelink resource allocation with base station control is referred to as a first mode (Mode 1) and sidelink resource allocation without base station control is referred to as a second mode (Mode 2). One or more aspects of the present disclosure provide for a method for indicating to a UE, a modulation and coding scheme table to choose for sidelink communications in Mode 1 (i.e., resource allocation with base station control) or Mode 2 (i.e., resource allocation without base station control) or both.

As depicted with reference to FIG. 2, the wireless communications system 200 may provide for methods to indicate an modulation and coding scheme table in Mode 1 and Mode 2 of sidelink communications. In some examples, a default modulation and coding scheme table and a preconfigured modulation and coding scheme table associated with a resource pool may be configured. In some examples, a transmitting UE (e.g., UE 115-a) may identify the default modulation and coding scheme table and the preconfigured modulation and coding scheme table associated with a resource pool. In some examples, each of the default modulation and coding scheme table and the preconfigured modulation and coding scheme table may be associated with a 256 quadrature amplitude modulation or a 64 quadrature amplitude modulation or a low spectral-efficiency 64 quadrature amplitude modulation. The UE 115-a may then transmit an indication of the default modulation and coding scheme table or the preconfigured modulation and coding scheme table to use for upcoming sidelink communications. For example, the UE 115-b may receive the indication, and may determine to use either the default modulation and coding scheme table or the preconfigured modulation and coding scheme table, for sidelink communications. In some instances, the UE 115-b may determine to use the preconfigured modulation and coding scheme table for upcoming sidelink communications. In some examples, the preconfigured modulation and coding scheme table may be configured to override the default modulation and coding scheme table.

According to one or more aspects of the present disclosure, the UE 115-a may provide the indication of the default modulation and coding scheme table or the preconfigured modulation and coding scheme table during a connection setup procedure. For example, the UE 115-a may provide the indication in a unicast link (i.e., one UE can indicate the modulation and coding scheme table to another UE). In some cases, the UE 115-*a* may indicate the modulation and coding scheme table to be used by the UE 115-*b*. Alternatively, the UE 115-*a* may enable the use of two modulation and coding scheme tables. For instance, the UE 115-*a* may determine that the UE 115-*b* is enabled to use multiple modulation and coding scheme tables, and the UE 115-*a* may provide the indication based on the determination. Additionally or alternatively, the UE 115-*a* may provide a dynamic indication to indicate the modulation and coding scheme table to the UE 115-*b*. In some examples, the dynamic indication may include an explicit indication in a sidelink control information via a field in the sidelink control information (e.g., SCI-1 or SCI-2). In some cases, the sidelink control information may indicate the modulation and coding scheme table to be used by the UE 115-*b*. In some examples, the UE 115-*b* may receive a sidelink control information and may identify a field included in the sidelink control information. The field may include the indication of the preconfigured modulation and coding scheme table.

In some cases, the sidelink control information may include a two-stage control, where decoding information for the second stage of the sidelink control information is included in the first stage of the sidelink control information. The UE 115-*a* may indicate the modulation and coding scheme table by scrambling (using a mask) a cyclic redundancy check for the sidelink control information. According to some aspects, the UE 115-*b* may receive a sidelink control information and may identify one or more bits associated with a cyclic redundancy check for the sidelink control information. The UE 115-*b* may then descramble the one or more bits associated with the cyclic redundancy check for the sidelink control information, and may communicate with the UE 115-*b* based on the descrambling. In some cases, the UE 115-*a* may provide an implicit indication of the modulation and coding scheme table using a format associated with the sidelink control information (by associating a format associated with the sidelink control information with a given format). In some examples, the SCI-2 format may use table 0 and other formats may use modulation and coding scheme table 1. In some cases, the UE 115-*b* may receive a sidelink control information and may identify a format associated with the sidelink control information. The UE 115-*b* may identify the modulation and coding scheme table based on the format associated with the sidelink control information.

In some instances, the modulation and coding scheme table may be associated with one or more communication parameters. For example, the UE 115-*b* may transmit one or more communication parameters to the UE 115-*a*. The one or more communication parameters may include one or more of a sidelink channel state information report, a sidelink hybrid automatic repeat request acknowledgement feedback, a quality of service, a priority, or a service. In some examples, the service may include an ultra-reliable low-latency communication or an enhanced mobile broadband.

In some implementations, a UE 115-*b* may be configured to fallback to a default table based on one or more fallback conditions. For example, the wireless communications system 200 is a dynamic system, and the modulation and coding scheme table may change based on one or more fallback conditions. In one example, the UE 115-*b* may select the preconfigured modulation and coding scheme table based on receiving the indication. The UE 115-*b* may determine that at least one fallback condition is satisfied, and the UE 115-*b* may then fallback to a default modulation and coding scheme table based on determining that at least one fallback condition is satisfied. In one example, the one or more fallback conditions may include a predefined period passing from a prior transmission. For instance, the UE 115-*b* may determine that a predetermined time period has passed from a prior transmission, and select, based on determining that the predetermined time period has passed, a default modulation and coding scheme table to use for upcoming sidelink communications. In some cases, the prior transmission may include a keep-alive transmission.

Additionally or alternatively, the one or more fallback conditions may include a predefined period passing from a last positive feedback received to or transmitted from the UE 115-*b*. For example, the UE 115-*b* may determine that a predetermined time period has passed from a prior positive feedback received at the UE 115-*b* or transmitted to the UE 115-*b*. The UE 115-*b* may then select, based on determining that the predetermined time period has passed, the default modulation and coding scheme table to use for upcoming sidelink communications. In some examples, the UE 115-*b* may start a timer upon transmission of a positive feedback. The UE 115-*b* may then fallback to the default modulation and coding scheme table upon expiration of the timer. Alternatively, the UE 115-*b* may start a timer upon reception of a positive feedback, and fallback to the default modulation and coding scheme table based on determining that the timer has expired. In some examples, the one or more fallback conditions may include a predefined period passing from a feedback reception or transmission. Additionally or alternatively, the one or more fallback conditions may include a predefined period passing from a connection establishment. In some implementations, the UE 115-*b* may fall back to the default modulation and coding scheme table upon receiving an explicit indication from a transmitter UE (e.g., UE 115-*a*).

According to one example, the UE 115-*b* may receive an indication of a modulation and coding scheme table (or a list of modulation and coding scheme tables) from the base station 105-*a*. The UE 115-*b* may select a modulation and coding scheme table to use for upcoming sidelink communications after receiving the indication from the base station. For example, the base station 105-*a* may transmit an indication of the modulation and coding scheme table (or a list of modulation and coding scheme tables) and the UE 115-*b* may select the modulation and coding scheme table (from the list of modulation and coding scheme tables) after receiving the indication. The indication may include one or more of a radio resource control configuration, a field included in a downlink control information, a radio network temporary identifier, a scrambling associated with a cyclic redundancy check for the downlink control information, or a search space associated with a physical downlink control channel transmission. In some implementations, the base station 105-*b* may use one or more communication parameters (such as communication parameters transmitted by UE 115-*a*) to determine the modulation and coding scheme table. For example, the one or more communication parameters may include one or more of a sidelink channel state information report, a sidelink hybrid automatic repeat request acknowledgement feedback, a quality of service, a priority, or a service. In some examples, the service may include an ultra-reliable low-latency communication or an enhanced mobile broadband.

Figure 3:
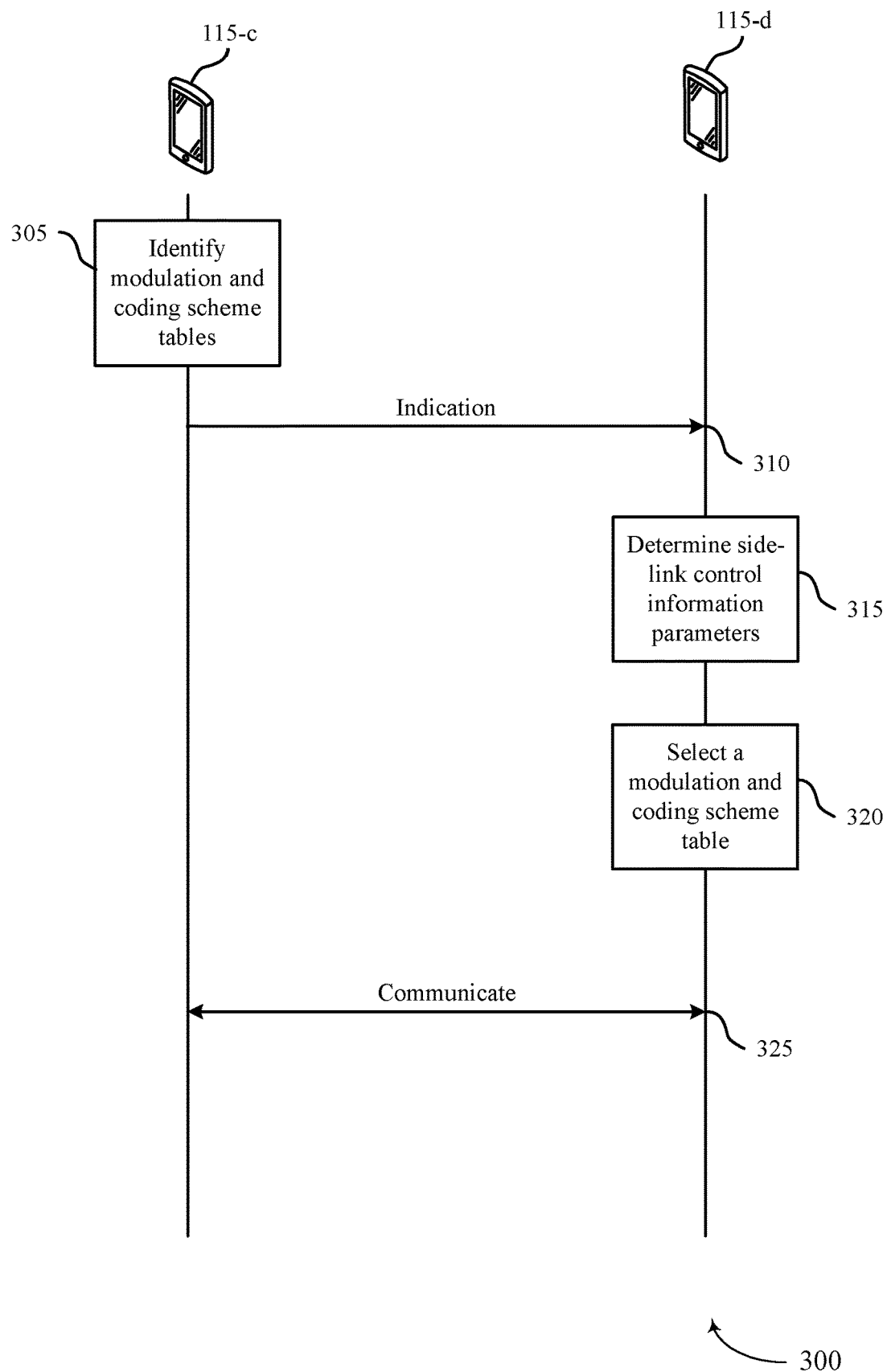
FIG. 3 illustrates an example of a process flow that supports modulation and coding scheme table selection for sidelink communications in accordance with aspects of the present disclosure.

FIG. 3 illustrates an example of a process flow 300 that supports modulation and coding scheme table selection for sidelink communications in accordance with aspects of the present disclosure. In some examples, the process flow 300 may implement aspects of wireless communications system 100. The process flow 300 may include UE 115-*c* and UE 115-*d*, which may be examples of UEs 115 as described with reference to FIGS. 1 and 2. For instance, the UE 115-*c* may be an example of a transmitting UE and the UE 115-*d* may be an example of a receiving UE in a communications system supporting sidelink communications.

In the following description of the process flow 300, the operations between the UE 115-*c* and the UE 115-*d* may be transmitted in a different order than the exemplary order shown. The operations performed by the UE 115-*c* and the UE 115-*d* may be performed in different orders or at different times than the exemplary order shown. Some operations may also be left out of the process flow 300, or other operations may be added to the process flow 300. Further, the UE 115-*c* and the UE 115-*d* are not meant to be representative, as the described features may be associated with any number of devices.

At 305, the UE 115-*c* may identify modulation and coding scheme tables. For instance, the UE 115-*c* may identify a default modulation and coding scheme table and a preconfigured modulation and coding scheme table associated with a resource pool. At 310, the UE 115-*c* may transmit, to a receiving UE (e.g., UE 115-*d*), an indication of a modulation and coding scheme to use for an upcoming transmission. In some examples, the UE 115-*c* may transmit the default modulation and coding scheme table or the preconfigured modulation and coding scheme table to use for upcoming sidelink communications.

At 315, the UE 115-*d* may receive the indication and may determine one or more sidelink control information parameters. In some examples, the UE 115-*d* may receive a sidelink control information and may identify one or more bits associated with a cyclic redundancy check for the sidelink control information. The UE 115-*d* may then descramble the one or more bits associated with the cyclic redundancy check for the sidelink control information to identify the modulation and coding scheme table to use for upcoming sidelink communications. Additionally or alternatively, the UE 115-*d* may receive a sidelink control information and may identify a format associated with the sidelink control information. In some cases, the UE 115-*d* identify the modulation and coding scheme table based on the format associated with the sidelink control information.

At 320, the UE 115-*d* may select a modulation and coding scheme based on the received indication. For example, the UE 115-*d* may select between the default modulation and coding scheme table and the preconfigured modulation and coding scheme table based on the received indication. At 325, the UE 115-*d* and the UE 115-*c* may communicate based on a selected modulation and coding scheme table. In some examples, the UE 115-*d* and the UE 115-*c* may communicate based on the preconfigured modulation and coding scheme table.

Figure 4:
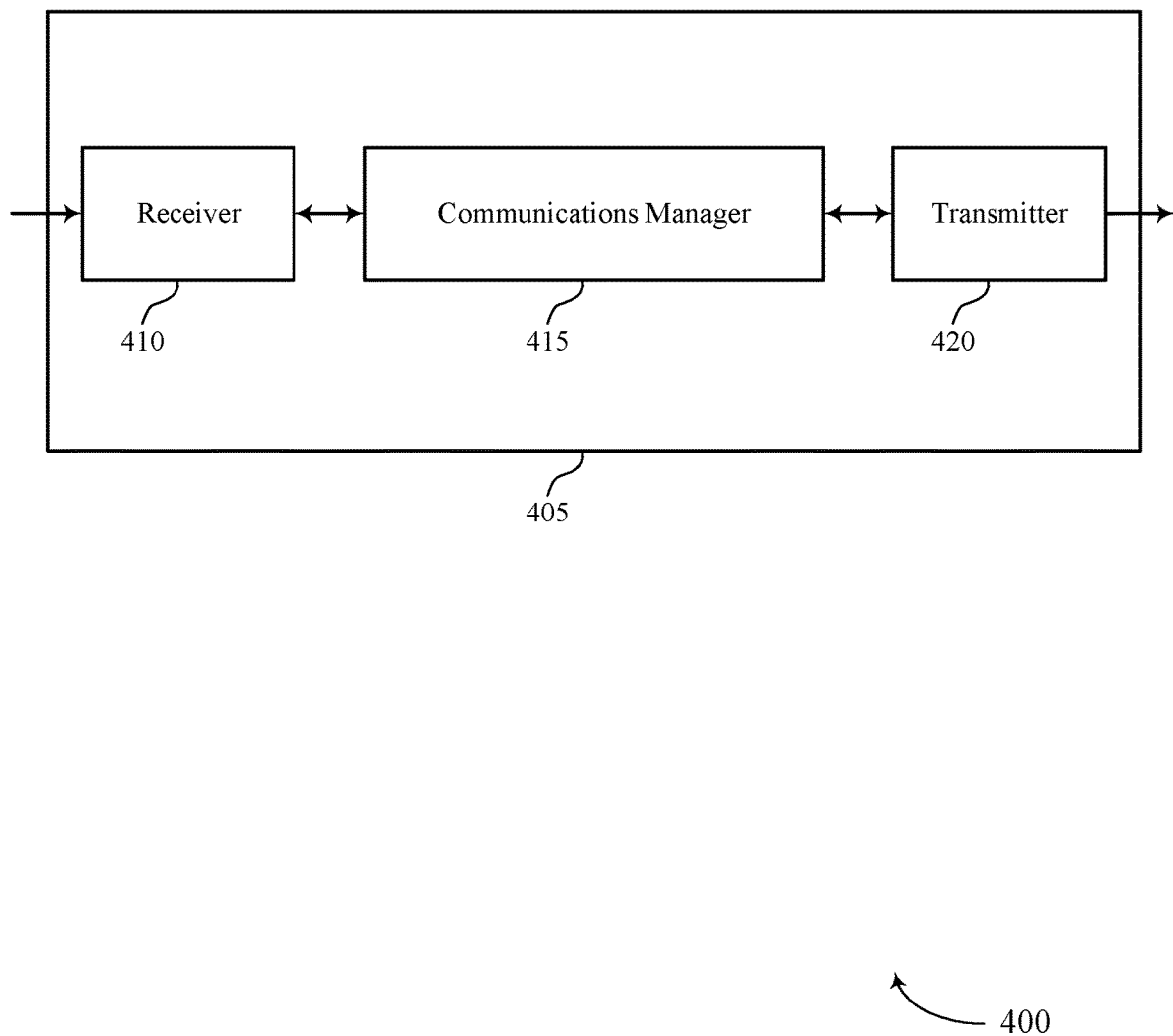
FIGS. 4 and 5 show block diagrams of devices that support modulation and coding scheme table selection for sidelink communications in accordance with aspects of the present disclosure.

FIG. 4 shows a block diagram 400 of a device 405 that supports modulation and coding scheme table selection for sidelink communications in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to modulation and coding scheme table selection for sidelink communications, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify a default modulation and coding scheme table and a preconfigured modulation and coding scheme table associated with a resource pool, receive, from a transmitting UE, an indication of the preconfigured modulation and coding scheme table to use for upcoming sidelink communications, and communicate with the transmitting UE based on the preconfigured modulation and coding scheme table. The communications manager 415 may also identify a default modulation and coding scheme table and a preconfigured modulation and coding scheme table associated with a resource pool, transmit, to a receiving UE, an indication of the default modulation and coding scheme table or the preconfigured modulation and coding scheme table to use for upcoming sidelink communications, and communicate with the receiving UE based on the indicated modulation and coding scheme table. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
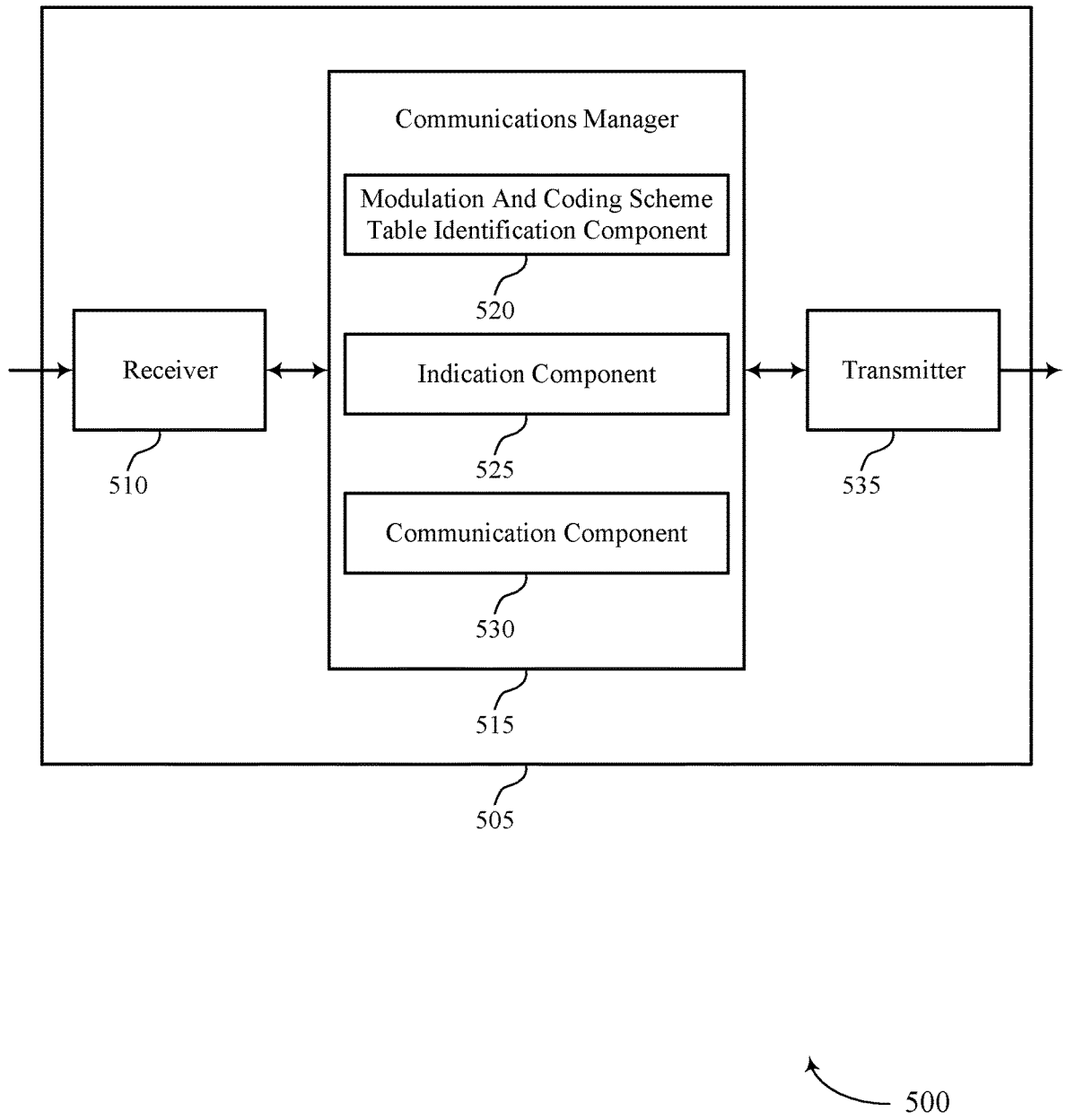

FIG. 5 shows a block diagram 500 of a device 505 that supports modulation and coding scheme table selection for sidelink communications in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to modulation and coding scheme table selection for sidelink communications, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a modulation and coding scheme table identification component 520, an indication component 525, and a communication component 530. The communications manager 515 may be an example of aspects of the communications manager 710 described herein.

The modulation and coding scheme table identification component 520 may identify a default modulation and coding scheme table and a preconfigured modulation and coding scheme table associated with a resource pool. The indication component 525 may receive, from a transmitting UE, an indication of the preconfigured modulation and coding scheme table to use for upcoming sidelink communications. The communication component 530 may communicate with the transmitting UE based on the preconfigured modulation and coding scheme table.

The modulation and coding scheme table identification component 520 may identify a default modulation and coding scheme table and a preconfigured modulation and coding scheme table associated with a resource pool. The indication component 525 may transmit, to a receiving UE, an indication of the default modulation and coding scheme table or the preconfigured modulation and coding scheme table to use for upcoming sidelink communications. The communication component 530 may communicate with the receiving UE based on the indicated modulation and coding scheme table.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
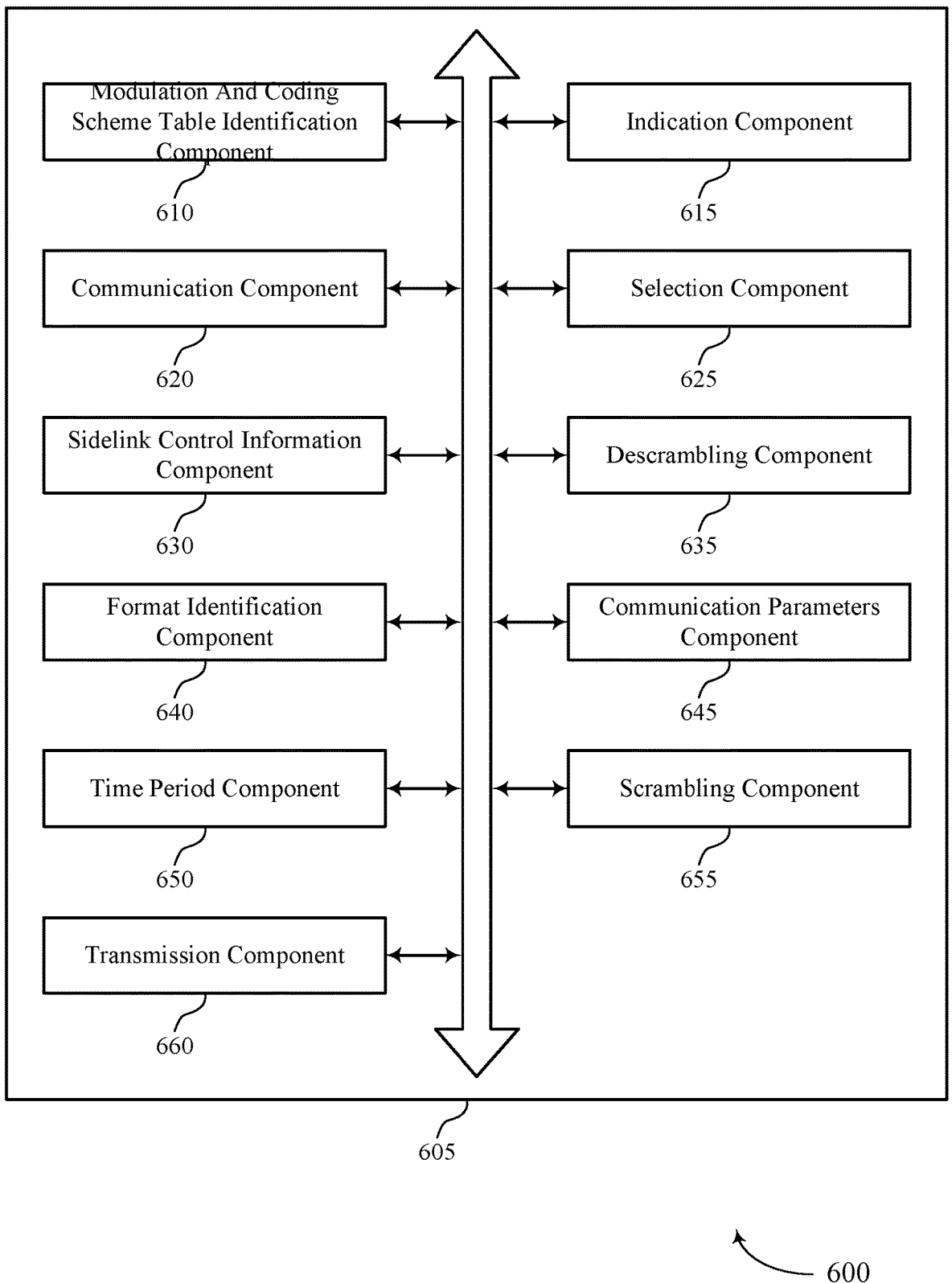
FIG. 6 shows a block diagram of a communications manager that supports modulation and coding scheme table selection for sidelink communications in accordance with aspects of the present disclosure.

FIG. 6 shows a block diagram 600 of a communications manager 605 that supports modulation and coding scheme table selection for sidelink communications in accordance with aspects of the present disclosure. The communications manager 605 may be an example of aspects of a communications manager 415, a communications manager 515, or a communications manager 710 described herein. The communications manager 605 may include a modulation and coding scheme table identification component 610, an indication component 615, a communication component 620, a selection component 625, a sidelink control information component 630, a descrambling component 635, a format identification component 640, a communication parameters component 645, a time period component 650, a scrambling component 655, and a transmission component 660. Each of these modules may communicate, directly or indirectly, with one another (e.g., via one or more buses).

The modulation and coding scheme table identification component 610 may identify a default modulation and coding scheme table and a preconfigured modulation and coding scheme table associated with a resource pool. The indication component 615 may receive, from a transmitting UE, an indication of the preconfigured modulation and coding scheme table to use for upcoming sidelink communications. The communication component 620 may communicate with the transmitting UE based on the preconfigured modulation and coding scheme table. In some cases, each of the default modulation and coding scheme table and the preconfigured modulation and coding scheme table is associated with a 256 quadrature amplitude modulation or a 64 quadrature amplitude modulation or a low spectral-efficiency 64 quadrature amplitude modulation.

The selection component 625 may select between the default modulation and coding scheme table and the preconfigured modulation and coding scheme table based on the received indication, where communicating with the transmitting UE is based on the selecting. In some examples, the modulation and coding scheme table identification component 610 may determine that the receiving UE is enabled to use multiple modulation and coding scheme tables, where communicating with the transmitting UE is based on the determining.

The sidelink control information component 630 may receive, from the transmitting UE, a sidelink control information. In some examples, the sidelink control information component 630 may identify a field included in the sidelink control information, the field including the indication of the preconfigured modulation and coding scheme table.

In some examples, the sidelink control information component 630 may receive, from the transmitting UE, a sidelink control information. In some examples, the sidelink control information component 630 may identify one or more bits associated with a cyclic redundancy check for the sidelink control information. The descrambling component 635 may descramble the one or more bits associated with the cyclic redundancy check for the sidelink control information, where communicating with the transmitting UE is based on descrambling the one or more bits.

In some examples, the sidelink control information component 630 may identify one or more bits associated with a cyclic redundancy check for a sidelink control information. The format identification component 640 may identify a format associated with the sidelink control information, where communicating with the transmitting UE is based on the format associated with the sidelink control information.

The communication parameters component 645 may transmit, to the transmitting UE, one or more communication parameters, where the indication of the preconfigured modulation and coding scheme table is based on the one or more communication parameters. In some cases, the one or more communication parameters include one or more of a sidelink channel state information report, a sidelink hybrid automatic repeat request acknowledgement feedback, a quality of service, a priority, or a service. In some cases, the service includes an ultra-reliable low-latency communication or an enhanced mobile broadband.

In some examples, the selection component 625 may select the preconfigured modulation and coding scheme table based on receiving the indication. The time period component 650 may determine that a predetermined time period has passed from a prior transmission. In some examples, the selection component 625 may select, based on determining that the predetermined time period has passed, the default modulation and coding scheme table to use for upcoming sidelink communications. In some cases, the prior transmission includes a keep-alive transmission.

In some examples, the time period component 650 may determine that a predetermined time period has passed from a prior positive feedback received at the receiving UE. In some examples, the selection component 625 may select, based on determining that the predetermined time period has passed, the default modulation and coding scheme table to use for upcoming sidelink communications.

In some examples, the time period component 650 may determine that a predetermined time period has passed from a prior positive feedback transmitted by the receiving UE. In some examples, the selection component 625 may select, based on determining that the predetermined time period has passed, the default modulation and coding scheme table to use for upcoming sidelink communications.

In some examples, the time period component 650 may determine that a predetermined time period has passed from a prior feedback received at the receiving UE. In some examples, the selection component 625 may select, based on determining that the predetermined time period has passed, the default modulation and coding scheme table to use for upcoming sidelink communications.

In some examples, the time period component 650 may determine that a predetermined time period has passed from a prior feedback transmitted by the receiving UE. In some examples, the selection component 625 may select, based on determining that the predetermined time period has passed, the default modulation and coding scheme table to use for upcoming sidelink communications.

In some examples, the time period component 650 may determine that a predetermined time period has passed from a connection establishment by the receiving UE. In some examples, the selection component 625 may select, based on determining that the predetermined time period has passed, the default modulation and coding scheme table to use for upcoming sidelink communications.

In some examples, the indication component 615 may receive, from the transmitting UE, a second indication of a modulation and coding scheme table to use for upcoming sidelink communications. In some examples, the selection component 625 may select the default modulation and coding scheme table based on receiving the second indication.

In some examples, the indication component 615 may receive the indication of the preconfigured modulation and coding scheme table during a connection setup. In some examples, the indication component 615 may receive the indication of the preconfigured modulation and coding scheme table over a unicast link or a group-cast link.

In some examples, the modulation and coding scheme table identification component 610 may identify a default modulation and coding scheme table and a preconfigured modulation and coding scheme table associated with a resource pool. In some cases, each of the default modulation and coding scheme table and the preconfigured modulation and coding scheme table is associated with a 256 quadrature amplitude modulation or a 64 quadrature amplitude modulation or a low spectral-efficiency 64 quadrature amplitude modulation. In some examples, the indication component 615 may transmit, to a receiving UE, an indication of the default modulation and coding scheme table or the preconfigured modulation and coding scheme table to use for upcoming sidelink communications. In some examples, the communication component 620 may communicate with the receiving UE based on the indicated modulation and coding scheme table.

The transmission component 660 may transmit, to the receiving UE, the sidelink control information, where a field included in the sidelink control information includes the indication of the modulation and coding scheme table. In some examples, the sidelink control information component 630 may identify one or more bits associated with a cyclic redundancy check for the sidelink control information. The scrambling component 655 may scramble the one or more bits associated with the cyclic redundancy check for the sidelink control information. The transmission component 660 may transmit, to the receiving UE, the sidelink control information based on the scrambling, where the sidelink control information includes the indication of the modulation and coding scheme table.

In some examples, the transmission component 660 may transmit, to the receiving UE, a sidelink control information, where the indication of the modulation and coding scheme table is based on a format associated with the sidelink control information. In some examples, the communication parameters component 645 may receive, from the receiving UE, one or more communication parameters, where the indication of the modulation and coding scheme table is based on the one or more communication parameters. In some cases, the one or more communication parameters include one or more of a sidelink channel state information report, a sidelink hybrid automatic repeat request acknowledgement feedback, a quality of service, a priority, or a service. In some cases, the service includes an ultra-reliable low-latency communication or an enhanced mobile broadband.

In some examples, the transmission component 660 may transmit, to the receiving UE, a second indication of the modulation and coding scheme table to use for upcoming sidelink communications, where the second indication indicates the default modulation and coding scheme table. In some examples, the transmission component 660 may transmit the indication of the modulation and coding scheme table during a connection setup. In some examples, the transmission component 660 may transmit the indication of the modulation and coding scheme table over a unicast link or a group-cast link.

Figure 7:
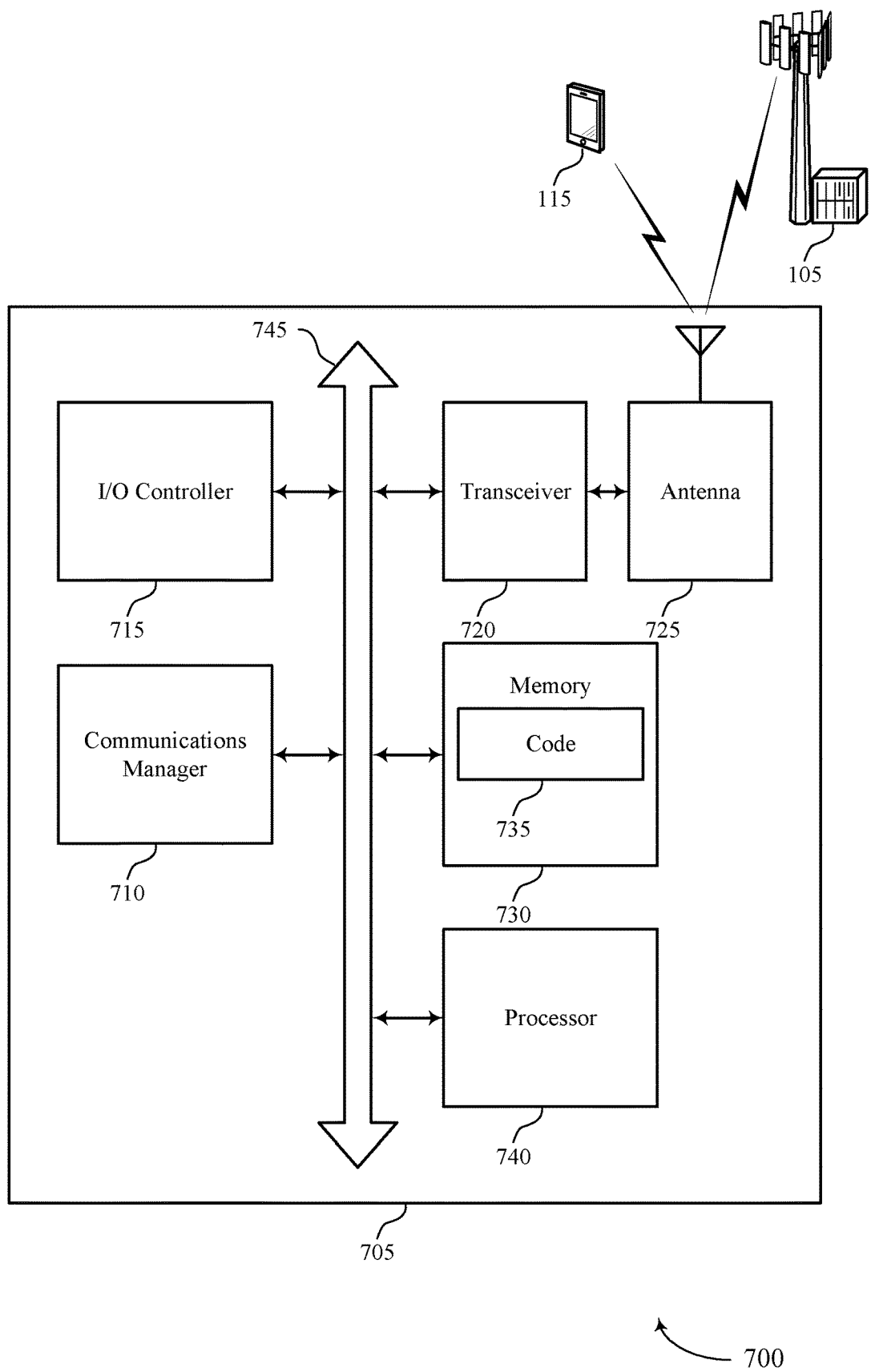
FIG. 7 shows a diagram of a system including a device that supports modulation and coding scheme table selection for sidelink communications in accordance with aspects of the present disclosure.

FIG. 7 shows a diagram of a system 700 including a device 705 that supports modulation and coding scheme table selection for sidelink communications in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify a default modulation and coding scheme table and a preconfigured modulation and coding scheme table associated with a resource pool, receive, from a transmitting UE, an indication of the preconfigured modulation and coding scheme table to use for upcoming sidelink communications, and communicate with the transmitting UE based on the preconfigured modulation and coding scheme table. The communications manager 710 may also identify a default modulation and coding scheme table and a preconfigured modulation and coding scheme table associated with a resource pool, transmit, to a receiving UE, an indication of the default modulation and coding scheme table or the preconfigured modulation and coding scheme table to use for upcoming sidelink communications, and communicate with the receiving UE based on the indicated modulation and coding scheme table.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting modulation and coding scheme table selection for sidelink communications).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
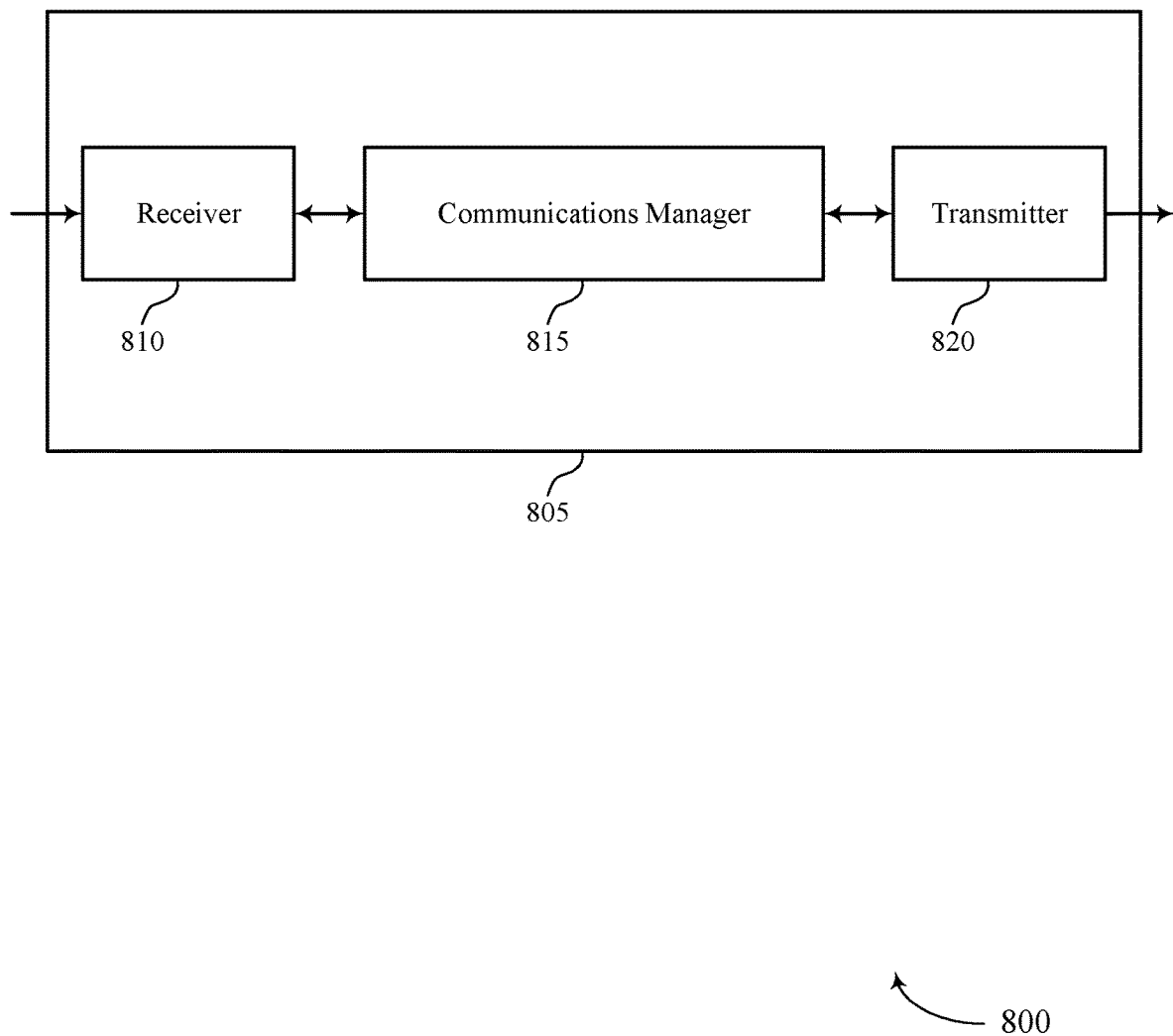
FIGS. 8 and 9 show block diagrams of devices that support modulation and coding scheme table selection for sidelink communications in accordance with aspects of the present disclosure.

FIG. 8 shows a block diagram 800 of a device 805 that supports modulation and coding scheme table selection for sidelink communications in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to modulation and coding scheme table selection for sidelink communications, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a modulation and coding scheme table to be used by a UE for upcoming sidelink communications and transmit, to the UE, an indication of the modulation and coding scheme table based on the identifying. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
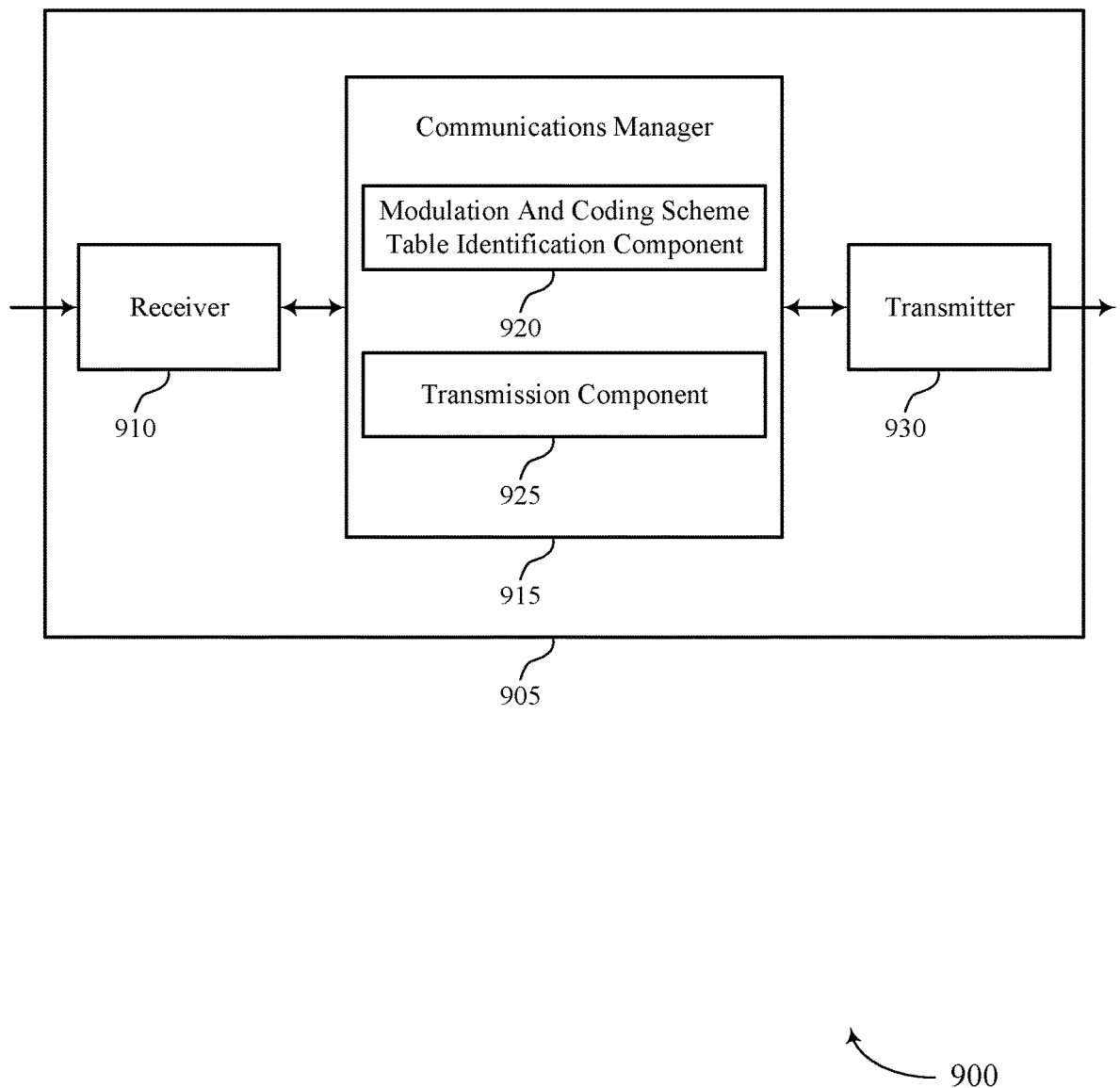

FIG. 9 shows a block diagram 900 of a device 905 that supports modulation and coding scheme table selection for sidelink communications in accordance with aspects of the present disclosure. The device 905 may be an example of aspects of a device 805, or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to modulation and coding scheme table selection for sidelink communications, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a modulation and coding scheme table identification component 920 and a transmission component 925. The communications manager 915 may be an example of aspects of the communications manager 1110 described herein.

The modulation and coding scheme table identification component 920 may identify a modulation and coding scheme table to be used by a UE for upcoming sidelink communications. The transmission component 925 may transmit, to the UE, an indication of the modulation and coding scheme table based on the identifying.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
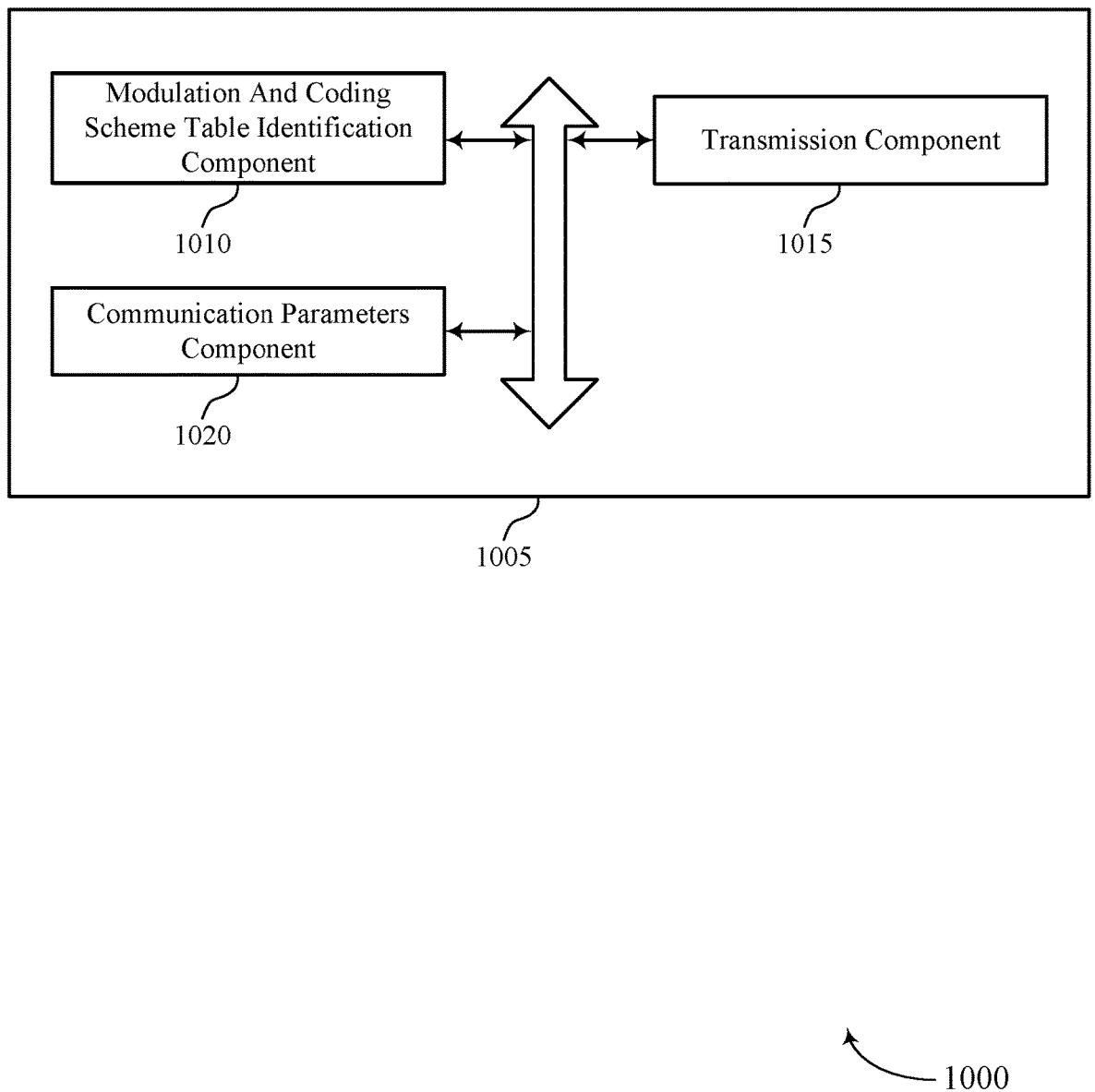
FIG. 10 shows a block diagram of a communications manager that supports modulation and coding scheme table selection for sidelink communications in accordance with aspects of the present disclosure.

FIG. 10 shows a block diagram 1000 of a communications manager 1005 that supports modulation and coding scheme table selection for sidelink communications in accordance with aspects of the present disclosure. The communications manager 1005 may be an example of aspects of a communications manager 815, a communications manager 915, or a communications manager 1110 described herein. The communications manager 1005 may include a modulation and coding scheme table identification component 1010, a transmission component 1015, and a communication parameters component 1020. Each of these modules may communicate, directly or indirectly, with one another (e.g., via one or more buses).

The modulation and coding scheme table identification component 1010 may identify a modulation and coding scheme table to be used by a UE for upcoming sidelink communications. The transmission component 1015 may transmit, to the UE, an indication of the modulation and coding scheme table based on the identifying.

In some cases, the modulation and coding scheme table is associated with a 256 quadrature amplitude modulation or a 64 quadrature amplitude modulation or a low spectral-efficiency 64 quadrature amplitude modulation. In some cases, the indication includes one or more of a radio resource control configuration, a field included in a downlink control information, a radio network temporary identifier, a scrambling associated with a cyclic redundancy check for the downlink control information, or a search space associated with a physical downlink control channel transmission.

The communication parameters component 1020 may receive, from a transmitting UE, one or more communication parameters, where the indication of the modulation and coding scheme table is based on the one or more communication parameters. In some cases, the one or more communication parameters include one or more of a sidelink channel state information report, a sidelink hybrid automatic repeat request acknowledgement feedback, a quality of service, a priority, or a service. In some cases, the service includes an ultra-reliable low-latency communication or an enhanced mobile broadband.

Figure 11:
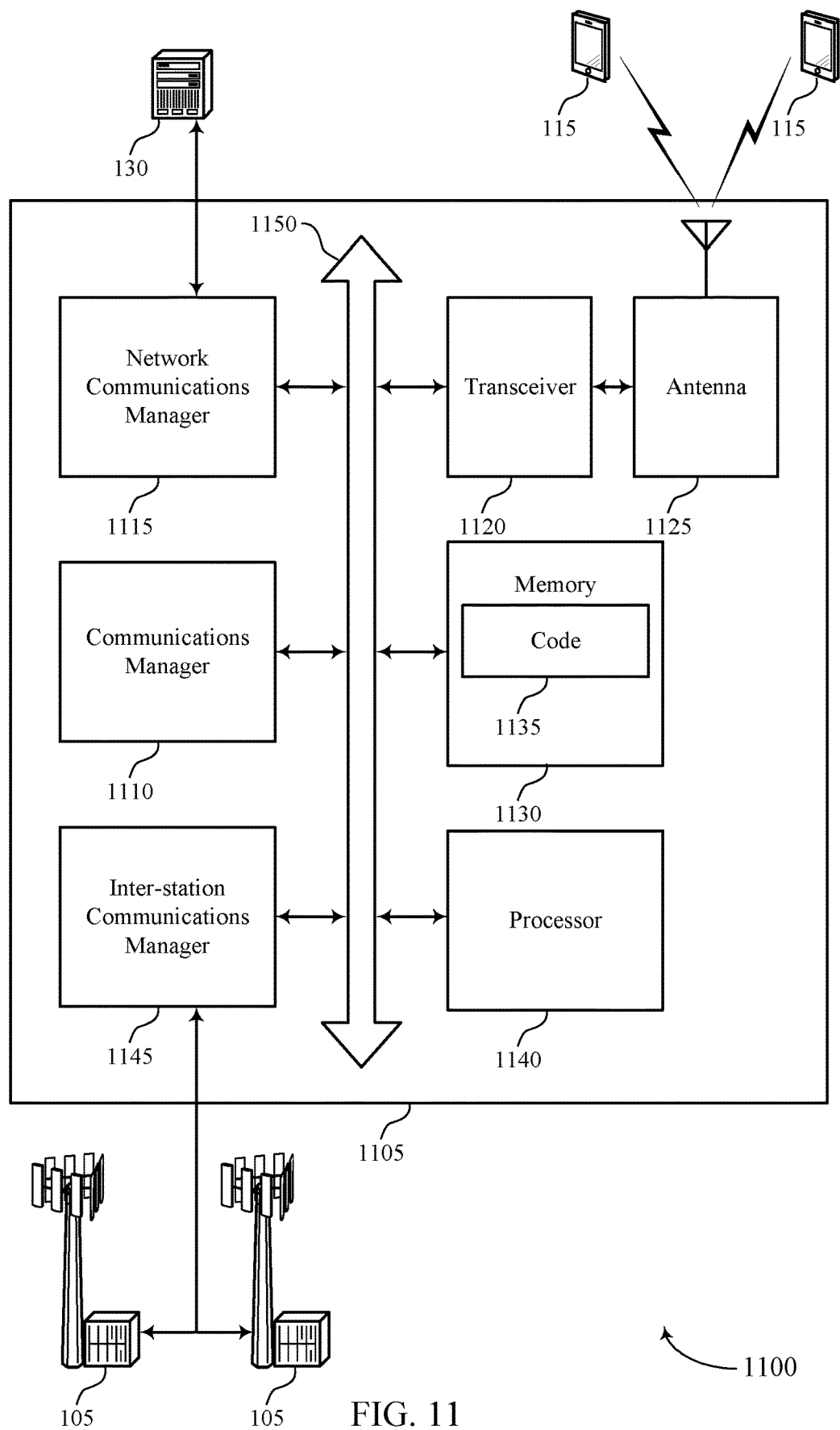
FIG. 11 shows a diagram of a system including a device that supports modulation and coding scheme table selection for sidelink communications in accordance with aspects of the present disclosure.

FIG. 11 shows a diagram of a system 1100 including a device 1105 that supports modulation and coding scheme table selection for sidelink communications in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify a modulation and coding scheme table to be used by a UE for upcoming sidelink communications and transmit, to the UE, an indication of the modulation and coding scheme table based on the identifying.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting modulation and coding scheme table selection for sidelink communications).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
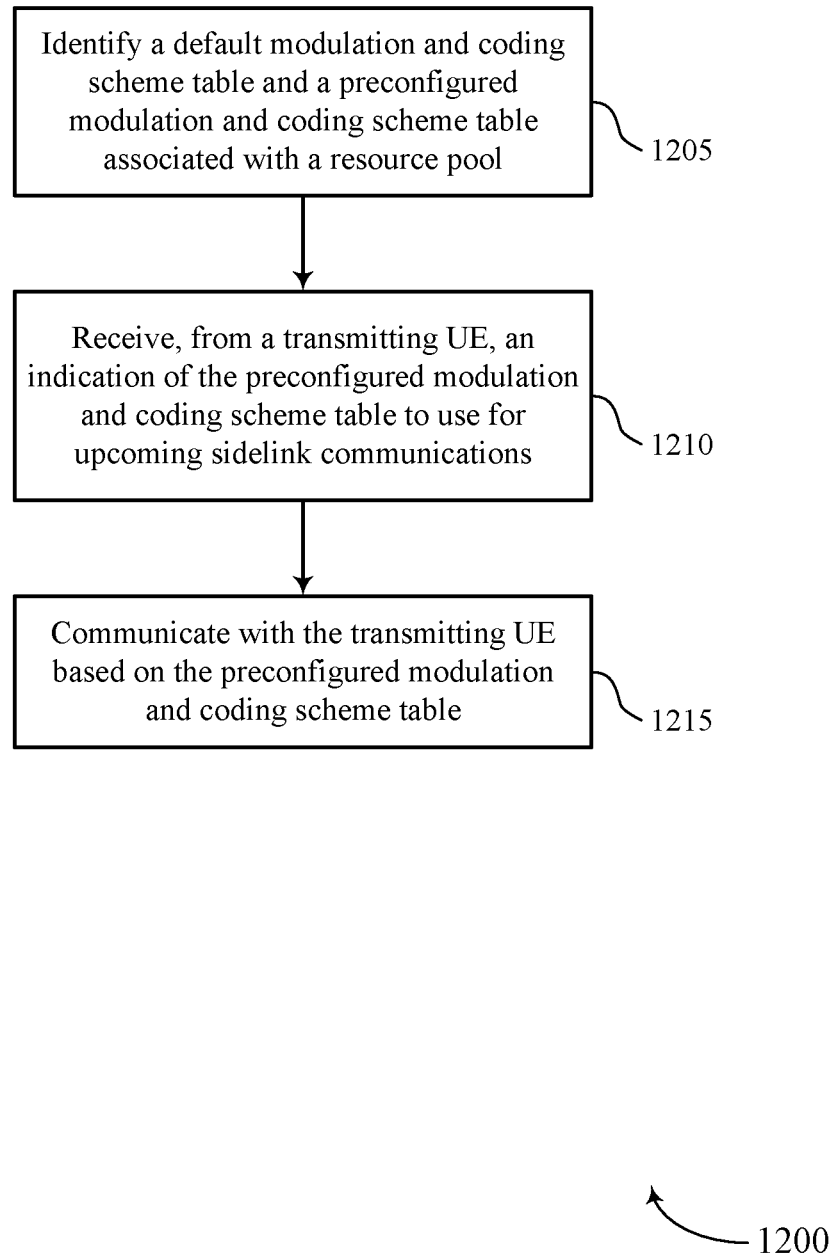
FIGS. 12 through 15 show flowcharts illustrating methods that support modulation and coding scheme table selection for sidelink communications in accordance with aspects of the present disclosure.

FIG. 12 shows a flowchart illustrating a method 1200 that supports modulation and coding scheme table selection for sidelink communications in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may identify a default modulation and coding scheme table and a preconfigured modulation and coding scheme table associated with a resource pool. The operations of 1205 may be performed according to the methods described herein. In some examples, aspects of the operations of 1205 may be performed by a modulation and coding scheme table identification component as described with reference to FIGS. 4 through 7.

At 1210, the UE may receive, from a transmitting UE, an indication of the preconfigured modulation and coding scheme table to use for upcoming sidelink communications. The operations of 1210 may be performed according to the methods described herein. In some examples, aspects of the operations of 1210 may be performed by an indication component as described with reference to FIGS. 4 through 7.

At 1215, the UE may communicate with the transmitting UE based on the preconfigured modulation and coding scheme table. The operations of 1215 may be performed according to the methods described herein. In some examples, aspects of the operations of 1215 may be performed by a communication component as described with reference to FIGS. 4 through 7.

Figure 13:
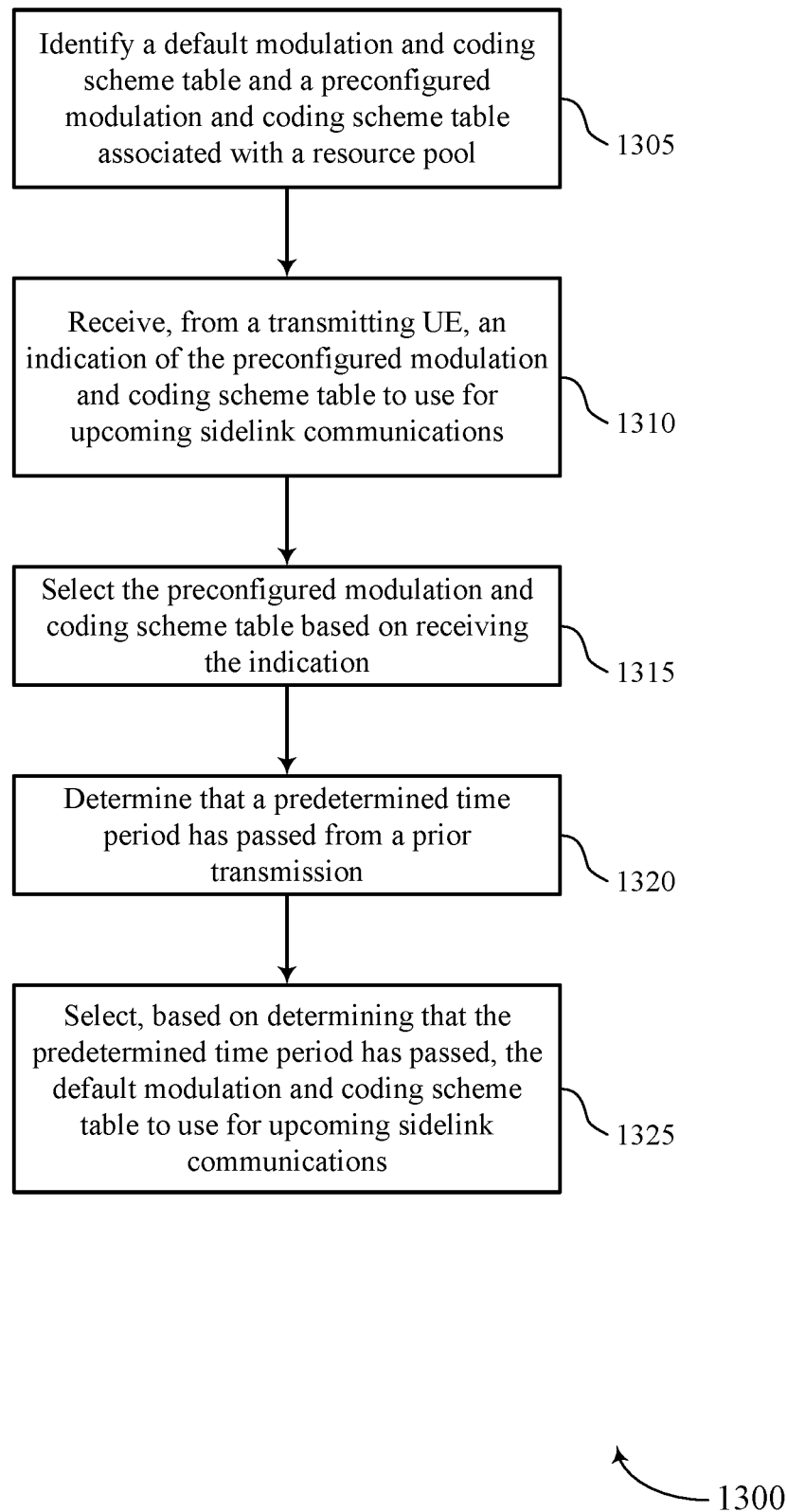

FIG. 13 shows a flowchart illustrating a method 1300 that supports modulation and coding scheme table selection for sidelink communications in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may identify a default modulation and coding scheme table and a preconfigured modulation and coding scheme table associated with a resource pool. The operations of 1305 may be performed according to the methods described herein. In some examples, aspects of the operations of 1305 may be performed by a modulation and coding scheme table identification component as described with reference to FIGS. 4 through 7.

At 1310, the UE may receive, from a transmitting UE, an indication of the preconfigured modulation and coding scheme table to use for upcoming sidelink communications. The operations of 1310 may be performed according to the methods described herein. In some examples, aspects of the operations of 1310 may be performed by an indication component as described with reference to FIGS. 4 through 7.

At 1315, the UE may select the preconfigured modulation and coding scheme table based on receiving the indication. The operations of 1315 may be performed according to the methods described herein. In some examples, aspects of the operations of 1315 may be performed by a selection component as described with reference to FIGS. 4 through 7.

At 1320, the UE may determine that a predetermined time period has passed from a prior transmission. The operations of 1320 may be performed according to the methods described herein. In some examples, aspects of the operations of 1320 may be performed by a time period component as described with reference to FIGS. 4 through 7.

At 1325, the UE may select, based on determining that the predetermined time period has passed, the default modulation and coding scheme table to use for upcoming sidelink communications. The operations of 1325 may be performed according to the methods described herein. In some examples, aspects of the operations of 1325 may be performed by a selection component as described with reference to FIGS. 4 through 7.

Figure 14:
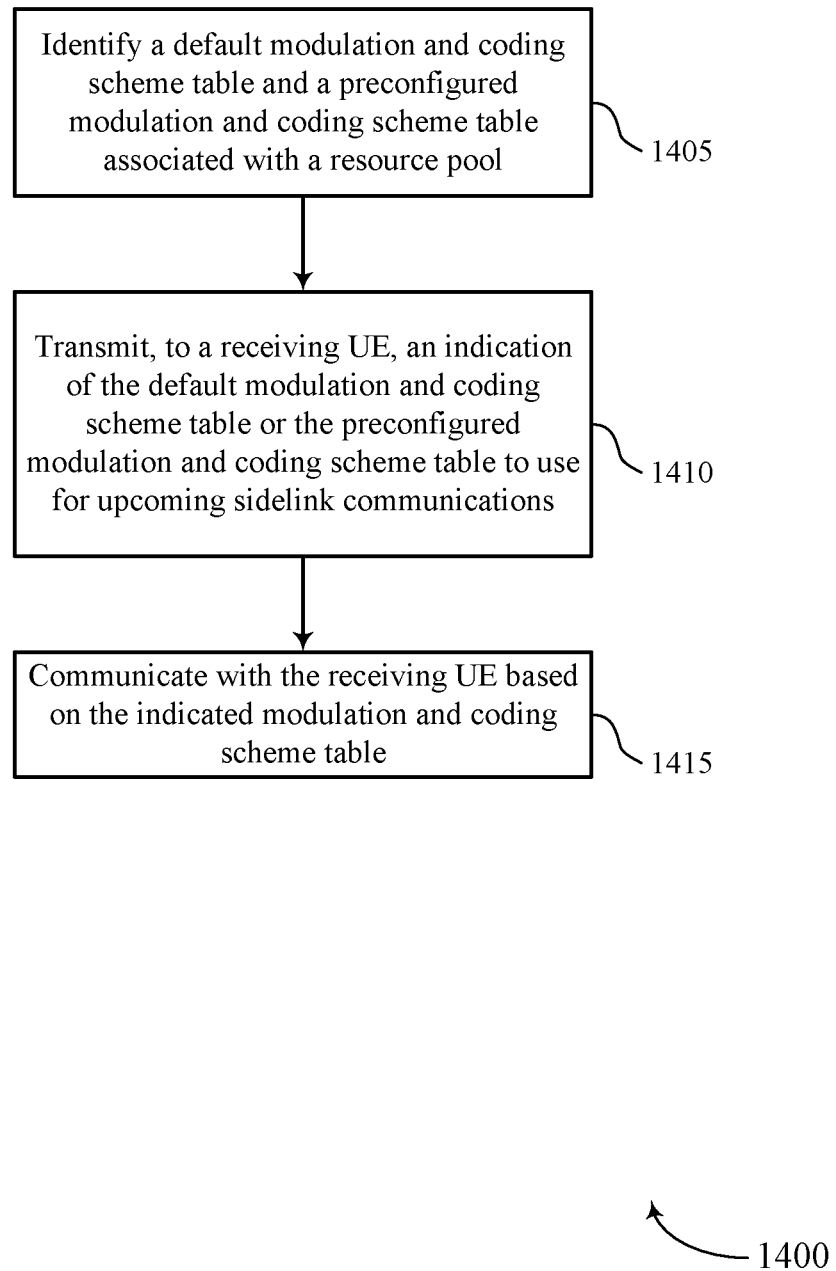

FIG. 14 shows a flowchart illustrating a method 1400 that supports modulation and coding scheme table selection for sidelink communications in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may identify a default modulation and coding scheme table and a preconfigured modulation and coding scheme table associated with a resource pool. The operations of 1405 may be performed according to the methods described herein. In some examples, aspects of the operations of 1405 may be performed by a modulation and coding scheme table identification component as described with reference to FIGS. 4 through 7.

At 1410, the UE may transmit, to a receiving UE, an indication of the default modulation and coding scheme table or the preconfigured modulation and coding scheme table to use for upcoming sidelink communications. The operations of 1410 may be performed according to the methods described herein. In some examples, aspects of the operations of 1410 may be performed by an indication component as described with reference to FIGS. 4 through 7.

At 1415, the UE may communicate with the receiving UE based on the indicated modulation and coding scheme table. The operations of 1415 may be performed according to the methods described herein. In some examples, aspects of the operations of 1415 may be performed by a communication component as described with reference to FIGS. 4 through 7.

Figure 15:
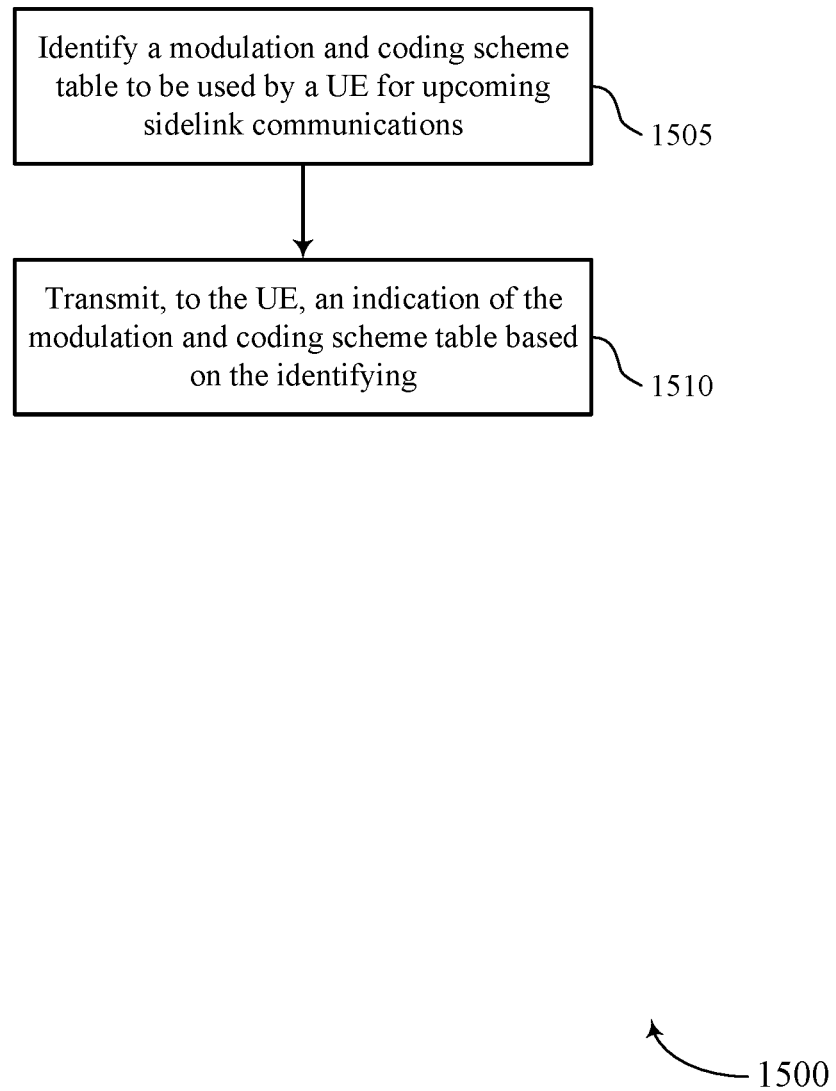

FIG. 15 shows a flowchart illustrating a method 1500 that supports modulation and coding scheme table selection for sidelink communications in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may identify a modulation and coding scheme table to be used by a UE for upcoming sidelink communications. The operations of 1505 may be performed according to the methods described herein. In some examples, aspects of the operations of 1505 may be performed by a modulation and coding scheme table identification component as described with reference to FIGS. 8 through 11.

At 1510, the base station may transmit, to the UE, an indication of the modulation and coding scheme table based on the identifying. The operations of 1510 may be performed according to the methods described herein. In some examples, aspects of the operations of 1510 may be performed by a transmission component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following examples are given by way of illustration. Aspects of the following examples may be combined with aspects or embodiments shown or discussed in relation to the figures or elsewhere herein.

Example 1 is a method of wireless communication at a base station that includes identifying a modulation and coding scheme table to be used by a UE for upcoming sidelink communications and transmitting, to the UE, an indication of the modulation and coding scheme table based on the identifying.

In Example 2, the method of example 1 may include receiving, from a transmitting UE, one or more communication parameters, where the indication of the modulation and coding scheme table may be based on the one or more communication parameters.

In Example 3, the method of examples 1-2 may include where the one or more communication parameters include one or more of a sidelink channel state information report, a sidelink hybrid automatic repeat request acknowledgement feedback, a quality of service, a priority, or a service.

In Example 4, the method of examples 1-3 may include where the service includes an ultra-reliable low-latency communication or an enhanced mobile broadband.

In Example 5, the method of examples 1-4 may include transmitting a radio resource control configuration indicating the modulation and coding scheme table.

In Example 6, the method of examples 1-4 may include transmitting a downlink control information to the UE, a field included in the downlink control information indicating the modulation and coding scheme table.

In Example 7, the method of examples 1-4 may include transmitting a radio network temporary identifier indicating the modulation and coding scheme table.

In Example 8, the method of examples 1-4 may include transmitting a radio network temporary identifier indicating the modulation and coding scheme table.

In Example 9, the method of examples 1-4 may include transmitting the indication of the modulation and coding scheme table using a scrambling associated with a cyclic redundancy check for a downlink control information.

In Example 10, the method of examples 1-4 may include transmitting the indication of the modulation and coding scheme table using a search space associated with a physical downlink control channel transmission.

In Example 11, the method of examples 1-10 may include where the modulation and coding scheme table may be associated with a 256 quadrature amplitude modulation or a 64 quadrature amplitude modulation or a low spectral-efficiency 64 quadrature amplitude modulation.

In Example 12, is a system including one or more processors and memory in electronic communication with the one or more processors storing instructions executable by the one or more processors to cause the system or apparatus to implement a method as in any of examples 1-11.

In Example 13, is an apparatus including means for implementing a method or realizing an apparatus as in any of examples 1-11.

In Example 14, is a non-transitory computer-readable medium storing instructions executable by one or more processors to cause the one or more processors to implement a method as in any of examples 1-11.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at an access network entity, comprising:
   identifying a modulation and coding scheme table to be used by a user equipment for upcoming sidelink communications based at least in part on a spectral efficiency of the modulation and coding scheme table; and
   transmitting, to the user equipment, a control message comprising a field indicating the modulation and coding scheme table based at least in part on the identifying and the control message further comprising an index value for an entry in the indicated modulation and coding scheme table, wherein a value of the field is based at least in part on the spectral efficiency of the modulation and coding scheme table, and wherein the indicated modulation and coding scheme table overrides a default modulation and coding scheme table at the user equipment.

2. The method of claim 1, further comprising:
   receiving, from a transmitting user equipment, one or more communication parameters, wherein the control message comprising the field indicating the modulation and coding scheme table is based at least in part on the one or more communication parameters.

3. The method of claim 2, wherein the one or more communication parameters comprise one or more of a sidelink channel state information report, a sidelink hybrid automatic repeat request acknowledgement feedback, a quality of service, a priority, or a service.

4. The method of claim 3, wherein the service comprises an ultra-reliable low-latency communication or an enhanced mobile broadband.

5. The method of claim 1, wherein transmitting the control message comprising a field indicating the modulation and coding scheme table comprises:
   transmitting a radio resource control configuration indicating the modulation and coding scheme table.

6. The method of claim 1, wherein transmitting the control message comprising a field indicating the modulation and coding scheme table comprises:
   transmitting a downlink control information to the user equipment, a field included in the downlink control information indicating the modulation and coding scheme table.

7. The method of claim 1, wherein transmitting the control message comprising a field indicating the modulation and coding scheme table comprises:
   transmitting a radio network temporary identifier indicating the modulation and coding scheme table.

8. The method of claim 1, wherein transmitting the control message comprising a field indicating the modulation and coding scheme table comprises:
   transmitting the control message comprising the field indicating the modulation and coding scheme table using a scrambling associated with a cyclic redundancy check for a downlink control information.

9. The method of claim 1, wherein transmitting the control message comprising a field indicating the modulation and coding scheme table comprises:
   transmitting the control message comprising the field indicating the modulation and coding scheme table using a search space associated with a physical downlink control channel transmission.

10. The method of claim 1, wherein the spectral efficiency of the modulation and coding scheme table is associated with a 256 quadrature amplitude modulation or a 64 quadrature amplitude modulation or a low spectral-efficiency 64 quadrature amplitude modulation.

11. An access network entity, comprising:
    one or more memories storing processor-executable code; and
    one or more processors coupled with the one or more memories and individually or collectively operable to execute the code to cause the access network entity to:
      identify a modulation and coding scheme table to be used by a user equipment for upcoming sidelink communications based at least in part on a spectral efficiency of the modulation and coding scheme table; and
      transmit, to the user equipment, a control message comprising a field indicating the modulation and coding scheme table based at least in part on the identifying and the control message further comprising an index value for an entry in the indicated modulation and coding scheme table, wherein a value of the field is based at least in part on the spectral efficiency of the modulation and coding scheme table, and
    wherein the indicated modulation and coding scheme table overrides a default modulation and coding scheme table at the user equipment.

12. The access network entity of claim 11, wherein the one or more processors are individually or collectively further operable to execute the code to cause the access network entity to:
    receive, from a transmitting user equipment, one or more communication parameters, wherein the control message comprising the field indicating the modulation and coding scheme table is based at least in part on the one or more communication parameters.

13. The access network entity of claim 12, wherein the one or more communication parameters comprise one or more of a sidelink channel state information report, a sidelink hybrid automatic repeat request acknowledgement feedback, a quality of service, a priority, or a service.

14. The access network entity of claim 13, wherein the service comprises an ultra-reliable low-latency communication or an enhanced mobile broadband.

15. The access network entity of claim 11, wherein, to transmit the control message comprising a field indicating the modulation and coding scheme table, the one or more processors are individually or collectively further operable to execute the code to cause the access network entity to:
    transmit a radio resource control configuration indicating the modulation and coding scheme table.

16. The access network entity of claim 11, wherein, to transmit the control message comprising a field indicating the modulation and coding scheme table, the one or more processors are individually or collectively further operable to execute the code to cause the access network entity to:

transmit a downlink control information to the user equipment, a field included in the downlink control information indicating the modulation and coding scheme table.

17. The access network entity of claim 11, wherein, to transmit the control message comprising a field indicating the modulation and coding scheme table, the one or more processors are individually or collectively further operable to execute the code to cause the access network entity to:
   transmit a radio network temporary identifier indicating the modulation and coding scheme table.

18. The access network entity of claim 11, wherein, to transmit the control message comprising a field indicating the modulation and coding scheme table, the one or more processors are individually or collectively further operable to execute the code to cause the access network entity to:
   transmit the control message comprising the field indicating the modulation and coding scheme table using a scrambling associated with a cyclic redundancy check for a downlink control information.

19. The access network entity of claim 11, wherein, to transmit the control message comprising a field indicating the modulation and coding scheme table, the one or more processors are individually or collectively further operable to execute the code to cause the access network entity to:
   transmit the control message comprising the field indicating the modulation and coding scheme table using a search space associated with a physical downlink control channel transmission.

20. The access network entity of of claim 11, wherein the spectral efficiency of the modulation and coding scheme table is associated with a 256 quadrature amplitude modulation or a 64 quadrature amplitude modulation or a low spectral-efficiency 64 quadrature amplitude modulation.

21. An apparatus for wireless communication at an access network entity, comprising:
   means for identifying a modulation and coding scheme table to be used by a user equipment for upcoming sidelink communications based at least in part on a spectral efficiency of the modulation and coding scheme table; and
   means for transmitting, to the user equipment, a control message comprising a field indicating the modulation and coding scheme table based at least in part on the identifying and the control message further comprising an index value for an entry in the indicated modulation and coding scheme table, wherein a value of the field is based at least in part on the spectral efficiency of the modulation and coding scheme table, and wherein the indicated modulation and coding scheme table overrides a default modulation and coding scheme table at the user equipment.

22. The apparatus of claim 21, further comprising:
means for receiving, from a transmitting user equipment, one or more communication parameters, wherein the control message comprising the field indicating the modulation and coding scheme table is based at least in part on the one or more communication parameters.

23. The apparatus of claim 22, wherein the one or more communication parameters comprise one or more of a sidelink channel state information report, a sidelink hybrid automatic repeat request acknowledgement feedback, a quality of service, a priority, or a service.

24. The apparatus of claim 23, wherein the service comprises an ultra-reliable low-latency communication or an enhanced mobile broadband.

25. The apparatus of claim 21, wherein the means for transmitting the control message comprising a field indicating the modulation and coding scheme table comprises:
   means for transmitting a radio resource control configuration indicating the modulation and coding scheme table.

26. A non-transitory computer-readable medium storing code for wireless communication at an access network entity, the code comprising instructions executable by a processor to:
   identify a modulation and coding scheme table to be used by a user equipment for upcoming sidelink communications based at least in part on a spectral efficiency of the modulation and coding scheme table; and
   transmit, to the user equipment, a control message comprising a field indicating the modulation and coding scheme table based at least in part on the identifying and the control message further comprising an index value for an entry in the indicated modulation and coding scheme table, wherein a value of the field is based at least in part on the spectral efficiency of the modulation and coding scheme table, and wherein the indicated modulation and coding scheme table overrides a default modulation and coding scheme table at the user equipment.

27. The non-transitory computer-readable medium of claim 26, wherein the instructions are further executable to:
   receive, from a transmitting user equipment, one or more communication parameters, wherein the control message comprising the field indicating the modulation and coding scheme table is based at least in part on the one or more communication parameters.

28. The non-transitory computer-readable medium of claim 27, wherein the one or more communication parameters comprise one or more of a sidelink channel state information report, a sidelink hybrid automatic repeat request acknowledgement feedback, a quality of service, a priority, or a service.

29. The non-transitory computer-readable medium of claim 28, wherein the service comprises an ultra-reliable low-latency communication or an enhanced mobile broadband.

30. The non-transitory computer-readable medium of claim 28, wherein the instructions to transmit the control message comprising a field indicating the modulation and coding scheme table are further executable to:
   transmit a radio resource control configuration indicating the modulation and coding scheme table.

* * * * *